United States Patent
Odani et al.

(10) Patent No.: US 9,985,312 B1
(45) Date of Patent: May 29, 2018

(54) NON-AQUEOUS ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Toru Odani, Kanagawa (JP); Tadahiko Kubota, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

(21) Appl. No.: 15/885,109

(22) Filed: Jan. 31, 2018

Related U.S. Application Data

(62) Division of application No. 14/522,982, filed on Oct. 24, 2014, now Pat. No. 9,887,431.

(30) Foreign Application Priority Data

Nov. 5, 2013 (JP) .................................. 2013-229179

(51) Int. Cl.
*H01M 10/0525* (2010.01)
*H01M 10/0566* (2010.01)
(Continued)

(52) U.S. Cl.
CPC ... *H01M 10/0525* (2013.01); *H01M 10/0567* (2013.01); *H01M 10/4235* (2013.01);
(Continued)

(58) Field of Classification Search
CPC ......... H01M 10/0525; H01M 10/0567; H01M 10/4235; H01M 2300/0025; Y02E 60/122; Y02T 10/7011
See application file for complete search history.

(56) References Cited

U.S. PATENT DOCUMENTS 4,808,497 A 2/1989 Blomgren et al.
2012/0265385 A1 10/2012 Funada et al.

FOREIGN PATENT DOCUMENTS

JP 60-158556 A 8/1985
JP 62-026763 A 2/1987
(Continued)

*Primary Examiner* — Brittany Raymond
(74) *Attorney, Agent, or Firm* — K&L Gates LLP

(57) ABSTRACT

A secondary battery includes: a cathode; an anode; and non-aqueous electrolytic solution including a cyclic ether compound that includes a skeleton and one or more substituent groups introduced into the skeleton. The skeleton includes one or more four-or-more-membered oxygen-containing rings. The one or more substituent groups each are a monovalent group represented by Formula (1).

—X—O—R          (1)

(X is one of a divalent chain saturated hydrocarbon group, a halide group thereof, and nothing. R is one of a monovalent chain saturated hydrocarbon group, etc. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

9 Claims, 6 Drawing Sheets

(51) Int. Cl.
  *H01M 10/42* (2006.01)
  *H01M 10/0567* (2010.01)
(52) U.S. Cl.
  CPC .... *H01M 2300/0025* (2013.01); *Y02E 60/122* (2013.01); *Y02T 10/7011* (2013.01)

(56) References Cited

FOREIGN PATENT DOCUMENTS

| | | |
|---|---|---|
| JP | 2001-155767 A | 6/2001 |
| JP | 2004-247274 A | 9/2004 |
| JP | 2006-012780 A | 1/2006 |
| JP | 2006-179210 A | 7/2006 |

NON-AQUEOUS ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application is a divisional of U.S. patent application Ser. No. 14/522,982 filed on Oct. 24, 2014, which claims priority to Japanese Priority Patent Application JP 2013-229179 filed in the Japan Patent Office on Nov. 5, 2013, the entire content of which is hereby incorporated by reference.

BACKGROUND

The present application relates to non-aqueous electrolytic solution used in a secondary battery, to a secondary battery that uses the non-aqueous electrolytic solution, to a battery pack, an electric vehicle, an electric power storage system, an electric power tool, and an electronic apparatus that use the secondary battery.

In recent years, various electronic apparatuses such as a mobile phone and a mobile information terminal device (a PDA) have been widely used, and it has been demanded to further reduce the size and the weight of the electronic apparatuses and to achieve their longer life. Accordingly, as an electric power source, a battery, in particular, a small and light-weight secondary battery capable of providing high energy density has been developed.

In these days, it has been considered to apply a secondary battery to various other applications in addition to the foregoing electronic apparatuses. Examples of such other applications may include a battery pack attachably and detachably mounted on the electronic apparatuses or the like, an electric vehicle such as an electric automobile, an electric power storage system such as a home electric power server, and an electric power tool such as an electric drill.

There have been proposed secondary batteries that utilize various charge and discharge principles in order to obtain battery capacity. In particular, attention has been paid to a secondary battery that obtains battery capacity utilizing insertion and extraction or precipitation and dissolution of an electrode reactant. One reason for this is because higher energy density is achieved in such secondary batteries than in a lead battery, a nickel-cadmium battery, etc.

A secondary battery includes a cathode, an anode, and electrolytic solution. The electrolytic solution includes a solvent and an electrolyte salt. A composition of the electrolytic solution that serves as a medium for charge and discharge reactions largely influences a performance of the secondary battery. Various considerations are therefore made on the composition of the electrolytic solution.

Specifically, in order to improve cyclic characteristics, etc., a heterocyclic compound such as an oxetane derivative or vinylglycidylether is used as an additive to the electrolytic solution (for example, see Japanese Unexamined Patent Application Publication Nos. S60-158556, S62-026763, 2001-155767, 2004-247274, 2006-012780, and 2006-179210).

SUMMARY

An electronic apparatus, etc. have been gaining higher performance and more functions. In accordance therewith, frequency in use of the electronic apparatus, etc. has increased, which results in a tendency of frequent charge and discharge of a secondary battery. Moreover, the electronic apparatus, etc. are used under various environments, which results in a tendency that the secondary battery is exposed to various temperature environments. Accordingly, there is still a room for improvement in performance of the secondary battery.

It is desirable to provide non-aqueous electrolytic solution, a secondary battery, a battery pack, an electric vehicle, an electric power storage system, an electric power tool, and an electronic apparatus that are capable of achieving superior battery characteristics.

According to an embodiment of the present application, there is provided non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

$$-X-O-R \quad (1)$$

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided a secondary battery including a cathode, an anode, and non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

$$-X-O-R \quad (1)$$

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided a battery pack including: a secondary battery; a control section configured to control operation of the secondary battery; and a switch section configured to switch the operation of the secondary battery according to an instruction of the control section. The secondary battery includes a cathode, an anode, and non-aqueous electrolytic solution including a cyclic ether compound.

The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

—X—O—R  (1)

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided an electric vehicle including: a secondary battery; a conversion section configured to convert electric power supplied from the secondary battery into drive power; a drive section configured to operate according to the drive power; and a control section configured to control operation of the secondary battery. The secondary battery includes a cathode, an anode, and non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

—X—O—R  (1)

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided an electric power storage system including: a secondary battery; one or more electric devices configured to be supplied with electric power from the secondary battery; and a control section configured to control the supplying of the electric power from the secondary battery to the one or more electric devices. The secondary battery includes a cathode, an anode, and non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

—X—O—R  (1)

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided an electric power tool including: a secondary battery; and a movable section configured to be supplied with electric power from the secondary battery. The secondary battery includes a cathode, an anode, and non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

—X—O—R  (1)

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-contain-ing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

According to an embodiment of the present application, there is provided an electronic apparatus including a secondary battery as an electric power supply source. The secondary battery includes a cathode, an anode, and non-aqueous electrolytic solution including a cyclic ether compound. The cyclic ether compound includes a skeleton and one or more substituent groups introduced into the skeleton. The skeleton includes one or more four-or-more-membered oxygen-containing rings. The one or more substituent groups are each a monovalent group represented by Formula (1).

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).)

Herein, "cyclic ether compound" refers to a compound that includes an oxygen-containing ring. The oxygen-containing ring includes one or more carbon chains, and one or more ether bonds (i.e., an oxygen atom (O)). The one or more carbon chains and the one or more ether bonds are bonded to one another so as to form a ring as a whole. Each of the one or more carbon chains may include one or more carbon-carbon multiple bonds (carbon-carbon double bond or carbon-carbon triple bond), or may include no carbon-carbon multiple bond. Further, each of the one or more carbon chains may be linear, or may be branched to include one or more side chains. However, the oxygen-containing ring may include, as constituent atom other than the oxygen atom, one or more of non-oxygen atoms such as nitrogen atom (N) and sulfur atom (S).

"Four-or-more-membered oxygen-containing ring" refers to an oxygen-containing ring in which a shape determined by carbon atom (C) in the carbon chain, the oxygen atom in the ether bond, and the non-oxygen atom (atom other than the oxygen atom) is a polygon having four or more angles. Based on this, 1,3-propylene oxide that is a four-membered ring, tetrahydrofuran that is a five-membered ring, etc. are included in "four-or-more-membered oxygen-containing ring", but ethylene oxide that is a three-membered ring is not included in "four-or-more-membered oxygen-containing ring". It is to be noted that the number and kinds of the four-or-more-membered oxygen-containing rings included in the skeleton are not particularly limited. Accordingly, the number of the four-or-more-membered oxygen-containing rings may be one, or may be two or larger. Also, the kinds of the four-or-more-membered oxygen-containing rings may be one, or may be two or more.

When two or more four-or-more-membered oxygen-containing rings are included in "skeleton", a bonding form between adjacent oxygen-containing rings is not particularly limited. Accordingly, carbon atoms in the adjacent oxygen-containing rings may form a single bond, or may form a multiple bond. Further, adjacent oxygen-containing rings may form a condensed ring, or may form a spiro structure (sharing one carbon atom).

It is to be noted that, as long as "skeleton" includes "one or more four-or-more-membered oxygen-containing rings", "skeleton" may further include one or more less-than-four-membered oxygen-containing rings (three-membered oxygen-containing rings), or may include one or more non-oxygen-containing rings. Also in these cases, a bonding form between adjacent oxygen-containing rings is not particularly limited, and a bonding form between the oxygen-containing ring and the non-oxygen-containing ring adjacent thereto is not particularly limited.

"Monovalent oxygen-containing cyclic saturated hydrocarbon group" refers to a group obtained by substituting one or more oxygen atoms for one or more of a plurality of carbon atoms forming a ring in a monovalent cyclic saturated hydrocarbon group. "Monovalent oxygen-containing cyclic unsaturated hydrocarbon group" refers to a group obtained by substituting one or more oxygen atoms for one or more of a plurality of carbon atoms forming a ring in a monovalent cyclic unsaturated hydrocarbon group.

"Halide group" refers to a group obtained by substituting one or more halogen groups for one or more hydrogen groups (—H) in a series of hydrocarbon groups such as the divalent chain saturated hydrocarbon group and the like described above. The halogen group may be, for example, one or more of a fluorine group (—F), a chlorine group (—Cl), a bromine group (—B), an iodine group (—I), and the like.

The phrase "carbon-carbon multiple bond bonded to an ether bond" refers to that the carbon-carbon multiple bond is positioned immediately next to the ether bond. More specifically, when attention is paid to a bonding relationship between the ether bond (—O—) and R (including —C=C— or —C≡C—), the condition "carbon-carbon multiple bond bonded to an ether bond" is satisfied in a case where a bond represented by —O—C=C— or —O—C≡C— is formed. On the other hand, the condition "carbon-carbon multiple bond bonded to an ether bond" is not satisfied in a case where a bond represented by —O—C—C=C—, —O—C—C≡C—, or the like is formed.

According to the non-aqueous electrolytic solution or the secondary battery of the embodiments of the present application, the non-aqueous electrolytic solution includes the above-described cyclic ether compound, and superior battery characteristics are therefore achieved. Moreover, a similar effect is achieved also in the battery pack, the electric vehicle, the electric power storage system, the electric power tool, or the electronic apparatus of the embodiment of the present application.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
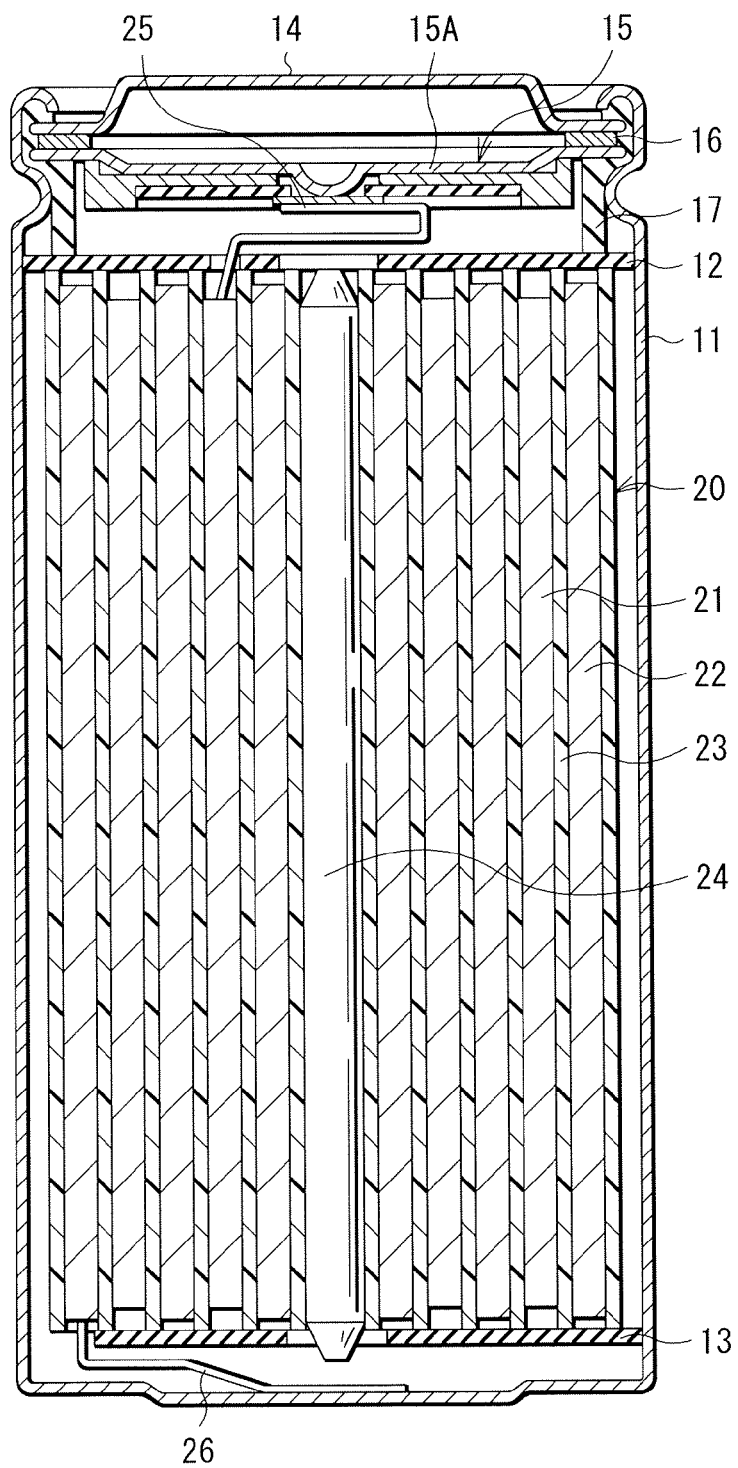
FIG. 1 is a cross-sectional view illustrating a configuration of a secondary battery (of a cylindrical type) that uses non-aqueous electrolytic solution of an embodiment of the present application.

Some embodiments of the present application are described below in detail with reference to the drawings. The description is provided in the following order.
1. Non-aqueous Electrolytic Solution
2. Secondary Battery Using Non-aqueous Electrolytic Solution
　2-1. Lithium Ion Secondary Battery (Cylindrical Type)
　2-2. Lithium Ion Secondary Battery (Laminated Film Type)
　2-3. Lithium Metal Secondary Battery (Cylindrical Type and Laminated Film Type)
3. Applications of Secondary Battery
　3-1. Battery Pack
　3-2. Electric Vehicle
　3-3. Electric Power Storage System
　3-4. Electric Power Tool

[1. Non-aqueous Electrolytic Solution]

First, description is provided of non-aqueous electrolytic solution of an embodiment of the present application (hereinafter, may be simply referred to as "electrolytic solution" or "electrolytic solution of the present application").

The electrolytic solution described herein is used in a secondary battery such as a lithium ion secondary battery. It goes without saying that the kind of the secondary battery in which the electrolytic solution is used is not limited to the lithium ion secondary battery, and may be other secondary battery.

[Cyclic Ether Compound]

The electrolytic solution includes one or more of cyclic ether compounds described below.

"Cyclic ether compound" refers to a compound that includes an oxygen-containing ring in which carbon chain and ether bond (i.e., oxygen atom) are bonded so as to form a ring as a whole. The number of the carbon chain is one or larger. The number of the ether bond is also one or larger. The number of the oxygen-containing ring may be one, or may be two or larger. However, the oxygen-containing ring may include, as constituent atom other than the oxygen atom, one or more of non-oxygen atoms such as nitrogen atom and sulfur atom.

The carbon chain may include only a carbon-carbon single bond (—C—C—), may include only one or more carbon-carbon multiple bonds (—C=C— that is carbon-carbon double bond, or —C≡C— that is carbon-carbon triple bond, or may include both. Specifically, the above-described oxygen-containing ring may be an unsaturated oxygen-containing ring that includes the carbon-carbon multiple bond, or may be a saturated oxygen-containing ring that includes no carbon-carbon multiple bond. It is to be noted that, when the carbon chain includes the carbon-carbon multiple bond, that carbon chain may include, as the carbon-carbon multiple bond, only carbon-carbon double bond, only carbon-carbon triple bond, or both.

Moreover, the carbon chain may be linear, or may be branched to include one or more side chains. In the branched carbon chain, the side chains may be bonded to one another.

More specifically, the cyclic ether compound includes a skeleton, and a substituent group that is introduced into the skeleton. The number of the substituent group may be only one, or may be two or larger.

"Skeleton" refers a part to be a base in the cyclic ether compound. "Substituent group" refers to a group that is introduced to the skeleton (for example, a carbon atom in the carbon chain) by being substituted for at least part of hydrogen groups in the skeleton.

[Skeleton of Cyclic Ether Compound]

The skeleton includes a four-or-more-membered oxygen-containing ring, and the number of the four-or-more-membered oxygen-containing ring included in the skeleton may be only one, or may be two or larger. When the number of the oxygen-containing rings is two or larger, the kind of the oxygen-containing rings may be only one, or may be two or more.

"Four-or-more-membered oxygen-containing ring" refers to an oxygen-containing ring in which a shape determined by the carbon atom in the carbon chain, the oxygen atom in the ether bond, and the non-oxygen atom is a polygon having four or more angles. Based on this, 1,3-propylene oxide that is a four-membered ring, tetrahydrofuran that is a five-membered ring, etc. are included in "four-or-more-membered oxygen-containing ring", but ethylene oxide that is a three-membered ring is not included in "four-or-more-membered oxygen-containing ring".

When two or more four-or-more-membered oxygen-containing rings are included in the skeleton, a bonding form between adjacent oxygen-containing rings is not particularly limited. Accordingly, carbon atoms in the adjacent oxygen-containing rings may form a single bond, or may form a multiple bond. Further, adjacent oxygen-containing rings may form a condensed ring, or may form a spiro structure (sharing one carbon atom). Moreover, the adjacent oxygen-containing rings may be bonded to each other with a linking group such as a divalent chain saturated hydrocarbon group or an ether bond in between. The divalent chain saturated hydrocarbon group is described later in detail.

It is to be noted that, as long as the skeleton includes one or more four-or-more-membered oxygen-containing rings, the skeleton may further include one or more less-than-four-membered oxygen-containing rings (three-membered oxygen-containing rings). Also in this case, the adjacent oxygen-containing rings (the four-or-more-membered oxygen-containing ring and the less-than-four-membered oxygen-containing ring) may form a single bond, a multiple bond, a condensed ring, or a spiro structure. Moreover, the lessthan-four-membered oxygen-containing ring may be a saturated oxygen-containing ring, or an unsaturated oxygen-containing ring.

Moreover, as long as the skeleton includes one or more four-or-more-membered oxygen-containing rings, the skeleton may further include one or more non-oxygen-containing rings. "Non-oxygen-containing ring" refers to a compound in which carbon chains are bonded so as to form a ring as a whole. The details of the carbon chains are described as above. A bonding form between the oxygen-containing ring and the non-oxygen-containing ring is not particularly limited as with the bonding form between the oxygen-containing rings described above. A specific example of the non-oxygen-containing ring may be one of cyclohexane, benzene, and the like.

Specific examples of the four-or-more-membered oxygen-containing ring included in the skeleton may be as follows.

A specific example of the saturated oxygen-containing ring may be one of compounds represented by respective Formulas (2-1) to (2-12).

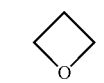
(2-1)

(2-2)

(2-3)

(2-4)

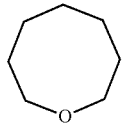
(2-5)

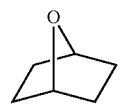
(2-6)

(2-7)

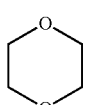
(2-8)

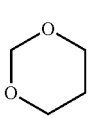
(2-9)

(2-10)

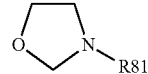
(2-11)

(2-12)

(R81 is one of a hydrogen group and a monovalent chain saturated hydrocarbon group.)

A specific example of the unsaturated oxygen-containing ring may be one of compounds represented by respective Formulas (3-1) to (3-12).

(3-1)

(3-2)

(3-3)

(3-4)

(3-5)

(3-6)

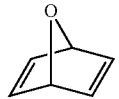
(3-7)

(3-8)

(3-9)

(3-10)

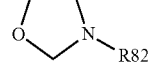

-continued (3-11)

(3-12)

(R82 is one of a hydrogen group and a monovalent chain saturated hydrocarbon group.)

A specific example of the skeleton may be as follows.

A specific example in a case where the skeleton is configured of one four-or-more-membered oxygen-containing ring may be one of compounds represented by respective Formulas (2-1) to (2-12) and (3-1) to (3-12) described above.

Other than the above, a specific example in a case where the skeleton includes one or more four-or-more-membered oxygen-containing rings may be one of compounds represented by respective Formulas (2-13) to (2-61).

(2-13)
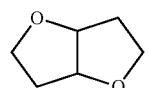

(2-14)
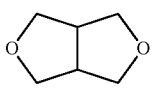

(2-15)
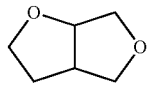

(2-16)
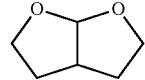

(2-17)
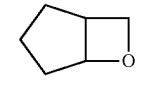

(2-18)
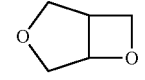

(2-19)
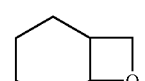

(2-20)
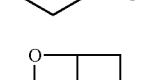

(2-21)
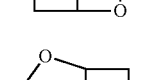

(2-22)
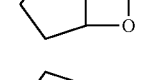

-continued (2-23)
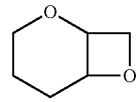

(2-24)
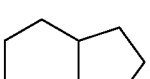

(2-25)
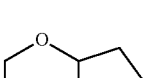

(2-26)
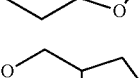

(2-27)
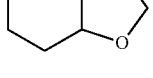

(2-28)
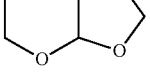

(2-29)
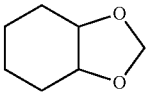

(2-30)
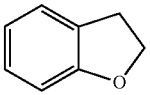

(2-31)
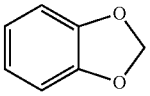

(2-32)
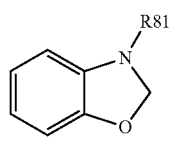

(2-33)
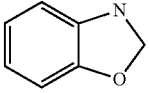

(2-34)

(2-35)

(2-36)
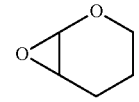

(R81 is one of a hydrogen group and a monovalent chain saturated hydrocarbon group.)

(2-37) 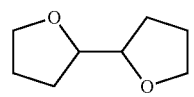
(2-38) 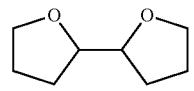
(2-39) 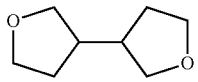
(2-40) 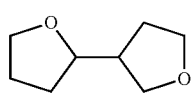
(2-41) 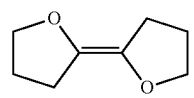
(2-42) 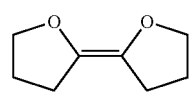
(2-43) 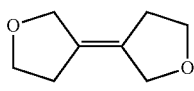
(2-44) 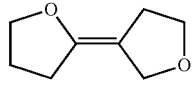
(2-45) 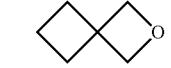
(2-46) 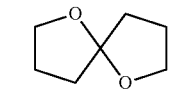
(2-47) 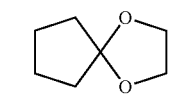
(2-48) 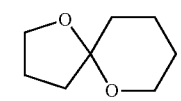
(2-49) 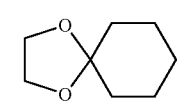
(2-50) 
(2-51) 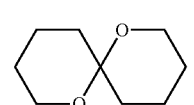
(2-52) 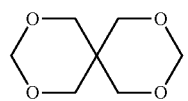
(2-53) 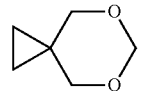
(2-54) 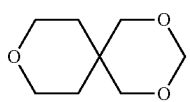
(2-55) 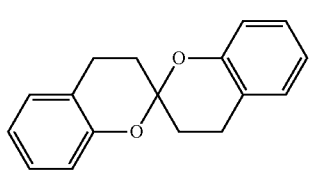
(2-56) 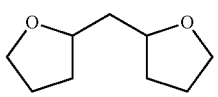
(2-57) 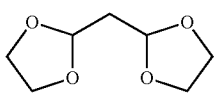
(2-58) 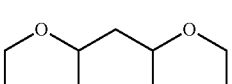
(2-59) 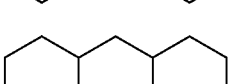
(2-60) 
(2-61) 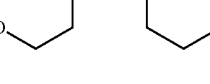
Moreover, another specific example in the case where the skeleton includes one or more four-or-more-membered oxygen-containing rings may be one of compounds represented by respective Formulas (3-13) to (3-15).
(3-13) 
(3-14) 

-continued

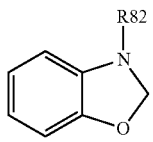

(3-15)

(R82 is one of a hydrogen group and a monovalent chain saturated hydrocarbon group.)

[Substituent Group in Cyclic Ether Compound]

The substituent group is a monovalent group represented by Formula (1). When the number of the substituent groups is two or larger, the two or more substituent groups may be of the same kind, or may be of different kinds. It goes without saying that the two or more substituent groups may include two or more kinds of substituent groups.

(X is one of a divalent chain saturated hydrocarbon group, a halide group thereof, and nothing. R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C═C— and —C≡C—) bonded to an ether bond (—O—).

"Divalent chain saturated hydrocarbon group" is a collective term for a divalent chain group that is formed of carbon (C) and hydrogen (H), and includes no carbon-carbon multiple bond. The divalent chain saturated hydrocarbon group may be linear, or may be branched to include one or more side chains. The divalent chain saturated hydrocarbon group may be, for example, an alkylene group having carbon number from 1 to 4 both inclusive, or the like, because compatibility with the cyclic ether compound, etc. are secured thereby. Specific examples of the alkylene group may include a methylene group (—CH$_2$—), an ethylene group (—C$_2$H$_4$—), a propylene group (—C$_3$H$_6$—), and a butylene group (—C$_4$H$_8$—).

As described above, X may not be provided. Specifically, X may be included or may not be included in the substituent group. The substituent group in a case where X is not included is represented by —O—R.

The kind of R is not particularly limited as long as the kind of R is one of the monovalent chain saturated hydrocarbon group, and the like described above. When the number of the substituent groups is two or larger, two or more Rs may be of the same kind, or may be of different kinds. It goes without saying that the two or more Rs may be of two or more kinds of the monovalent chain saturated hydrocarbon group, and the like described above.

"Monovalent chain saturated hydrocarbon group" is a collective term for a monovalent chain group that is formed of carbon and hydrogen, and includes no carbon-carbon multiple bond. The monovalent chain saturated hydrocarbon group may be linear, or may be branched to include one or more side chains. The monovalent chain saturated hydrocarbon group may be, for example, an alkyl group having carbon number from 1 to 8 both inclusive, or the like, because compatibility with the cyclic ether compound, etc. are secured thereby. Specific examples of the alkyl group may include a methyl group (—CH$_3$), an ethyl group (—C$_2$H$_5$), a propyl group (—C$_3$H$_7$), an n-butyl group (—C$_4$H$_8$), and a t-butyl group (—C(—CH$_3$)$_2$—CH$_3$).

"Monovalent chain unsaturated hydrocarbon group" is a collective term for a monovalent chain group that is formed of carbon and hydrogen, and includes one or more carbon-carbon multiple bonds. The monovalent chain unsaturated hydrocarbon group may be linear, or may be branched to include one or more side chains. The monovalent chain unsaturated hydrocarbon group may be, for example, one of an alkenyl group having carbon number from 2 to 8 both inclusive, an alkynyl group having carbon number from 2 to 8 both inclusive, and the like, because compatibility with the cyclic ether compound, etc. are secured thereby. Specific examples of the alkenyl group may include a vinyl group (—CH═CH$_2$) and an allyl group (—CH$_2$—CH═CH$_2$). Specific examples of the alkynyl group may include an ethynyl group (—C≡CH).

"Monovalent cyclic saturated hydrocarbon group" is a collective term for a monovalent cyclic group that is formed of carbon and hydrogen, and includes no carbon-carbon multiple bond. The monovalent cyclic saturated hydrocarbon group may include one or more side chains. The monovalent cyclic saturated hydrocarbon group may be, for example, a cycloalkyl group having carbon number from 3 to 8 both inclusive, or the like, because compatibility with the cyclic ether compound, etc. are secured thereby. Specific examples of the cycloalkyl group may include a cyclopropyl group, a cyclobutyl group, a cyclopentyl group, a cyclohexyl group, a cycloheptyl group, and a cyclooctyl group.

"Monovalent cyclic unsaturated hydrocarbon group" is a collective term for a monovalent cyclic group that is formed of carbon and hydrogen, and includes one or more carbon-carbon multiple bonds. The monovalent cyclic unsaturated hydrocarbon group may include one or more side chains. The monovalent cyclic unsaturated hydrocarbon group may be, for example, an aryl group having carbon number from 6 to 18 both inclusive, or the like. Other than this, the monovalent cyclic unsaturated hydrocarbon group may be, for example, a group represented by Formula (30-1), or the like, because compatibility with the cyclic ether compound, etc. are secured thereby. Specific examples of the aryl group may include a phenyl group and a naphthyl group.

"Monovalent oxygen-containing cyclic saturated hydrocarbon group" refers to a group obtained by substituting one or more oxygen atoms for one or more of a plurality of carbon atoms forming a ring in the monovalent cyclic saturated hydrocarbon group described above. The monovalent oxygen-containing cyclic saturated hydrocarbon group may be, for example, one of groups represented by respective Formulas (30-2) to (30-4) and the like.

"Monovalent oxygen-containing cyclic unsaturated hydrocarbon group" refers to a group obtained by substituting one or more oxygen atoms for one or more of a plurality of carbon atoms forming a ring in the monovalent cyclic unsaturated hydrocarbon group described above. The monovalent oxygen-containing cyclic unsaturated hydrocarbon group may be, for example, one of groups represented by respective Formulas (30-5) to (30-7) and the like.

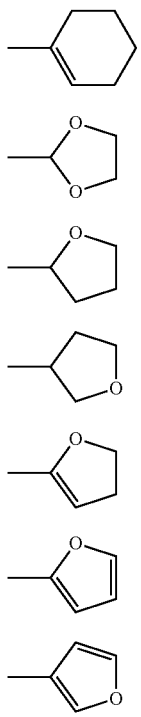

(30-1)
(30-2)
(30-3)
(30-4)
(30-5)
(30-6)
(30-7)

"Halide group" refers to a group obtained by substituting one or more halogen groups for one or more hydrogen groups (—H) in a series of hydrocarbon groups such as the divalent chain saturated hydrocarbon group described above. The halogen group may be, for example, one or more of a fluorine group (—F), a chlorine group (—Cl), a bromine group (—Br), an iodine group (—I), and the like.

"Monovalent group obtained by bonding two or more thereof" refers to a group obtained by bonding two or more of the series of groups such as the monovalent chain saturated hydrocarbon group described above so as to be monovalent as a whole. The monovalent group obtained by bonding two or more of the above-described groups may be, for example, a group (a benzyl group) obtained by bonding an alkyl group and an aryl group, a group obtained by bonding an alkyl group and a cycloalkyl group, or the like.

It is to be noted that R may be a group other than those described above. Specifically, R may be, for example, a monovalent oxygen-containing chain saturated hydrocarbon group, a halide group thereof, or the like. The monovalent oxygen-containing chain saturated hydrocarbon group is a collective term for a monovalent chain group that is formed of carbon, hydrogen, and oxygen (O), and includes no carbon-carbon multiple bond. The monovalent oxygen-containing chain saturated hydrocarbon group may be linear, or may be branched to include one or more side chains. The monovalent oxygen-containing chain saturated hydrocarbon group may be, for example, an alkoxy group having carbon number from 1 to 8 both inclusive, or the like, because compatibility with the cyclic ether compound, etc. are secured thereby. Specific examples of the alkoxy group may include a methoxy group (—OCH$_3$) and an ethoxy group (—OC$_2$H$_5$). The details of "halide group" are as described above.

However, one or more of Rs each include one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof. Hereinafter, "the monovalent chain unsaturated hydrocarbon group, the monovalent cyclic unsaturated hydrocarbon group, the monovalent oxygen-containing cyclic unsaturated hydrocarbon group, the halide group thereof, the monovalent group obtained by bonding two or more thereof" may be collectively and simply referred to as "monovalent chain unsaturated hydrocarbon group or (and) the like". Specifically, when the number of the substituent group is one, R that configures the substituent group includes the above-described monovalent chain unsaturated hydrocarbon group or the like. Alternatively, when the number of the substituent groups is two or larger, one or more of the two or more Rs each include the above-described monovalent chain unsaturated hydrocarbon group or the like. In particular, one or more of Rs may each preferably include one of the monovalent chain unsaturated hydrocarbon group and the halide group thereof.

"One or more of Rs each include the monovalent chain unsaturated hydrocarbon group or the like" refers to that one or more of Rs may each be the monovalent chain unsaturated hydrocarbon group, the monovalent cyclic unsaturated hydrocarbon group, the monovalent oxygen-containing cyclic unsaturated hydrocarbon group, the halide group thereof, the monovalent group obtained by bonding two or more thereof, or a group including one of those groups.

Moreover, in addition to that one or more of Rs each include the monovalent chain saturated hydrocarbon group or the like, the carbon-carbon multiple bond in each of the one or more of Rs is bonded to an ether bond.

The phrase "carbon-carbon multiple bond bonded to an ether bond" refers to that the carbon-carbon multiple bond is positioned immediately next to the ether bond, in other words, that the carbon-carbon multiple bond is directly bonded to the ether bond. More specifically, when attention is paid to a bonding relationship between the ether bond and R (including —C═C— or —C≡C—), the condition "carbon-carbon multiple bond bonded to an ether bond" is satisfied in a case where a bond represented by —O—C═C— or —O—C≡C— is formed. This is because no other group exists between the carbon-carbon multiple bond (—C═C— or —C≡C—) and the ether bond, and the carbon-carbon multiple bond is therefore directly bonded to the ether bond. On the other hand, the condition "carbon-carbon multiple bond bonded to an ether bond" is not satisfied in a case where a bond represented by —O—C—C═C—, —C—C—C≡C—, or the like is formed. This is because an unnecessary carbon atom exists between the carbon-carbon multiple bond (—C═C— or —C≡C—) and the ether bond, and the carbon-carbon multiple bond is therefore not directly bonded to the ether bond, but is indirectly bonded to the ether bond.

It is to be noted that when part of the two or more Rs includes the monovalent chain unsaturated hydrocarbon group or the like, the kind of the rest of the Rs is not particularly limited. Specifically, the rest of the Rs may each be a hydrogen group, the monovalent chain saturated hydrocarbon group, the monovalent cyclic saturated hydrocarbon group, the monovalent oxygen-containing cyclic saturated hydrocarbon group, the halide group thereof, or the monovalent group obtained by bonding two or more thereof. It goes without saying that the rest of the Rs may each be a monovalent chain unsaturated hydrocarbon group in which the carbon-carbon multiple bond is not bonded to the ether bond, or the like.

One reason that the electrolytic solution includes the cyclic ether compound is because the carbon-carbon multiple bond is bonded to the ether bond in the substituent group, and reactivity of the carbon-carbon multiple bond is therefore improved. In this case, a coating film resulting from a polymerization reaction of the cyclic ether compound is formed on a surface of the electrode at the time of charge and discharge, and a decomposition reaction of the electrolytic solution is therefore suppressed. This allows discharge capacity to be less likely to be decreased, and suppresses generation of gas resulting from the decomposition reaction of the electrolytic solution, even charge and discharge are repeatedly performed. Further, when the carbon-carbon multiple bond is bonded to the ether bond in the substituent group, an electrode reactant is more easily coordinated between the ether bond (the oxygen atom) and the oxygen atom in the oxygen-containing ring. This suppresses increase in resistance of the coating film, and makes it less likely for entrance and exit of the electrode reactant via the coating film to be prevented at the time of charge and discharge.

"Electrode reactant" is a substance related to charge and discharge reactions, and may be, for example, lithium (Li) in a lithium ion secondary battery.

In particular, when the number of the substituent groups is two or larger, all of two or more Rs may each preferably include the monovalent chain unsaturated hydrocarbon group or the like. This is because reactivity of the carbon-carbon multiple bond is further improved, and the electrode reactant is further more easily coordinated between the ether bond (the oxygen atom) and the oxygen atom in the oxygen-containing ring, which achieves a higher effect.

A position at which the substituent group is introduced into the skeleton is not particularly limited. Accordingly, when the skeleton includes a four-or-more-membered oxygen-containing ring, a less-than-four-membered oxygen-containing ring, and a non-oxygen-containing ring, the substituent group may be introduced only into the four-or-more-membered oxygen-containing ring, may be introduced only into the less-than-four-membered oxygen-containing ring, may be introduced only into the non-oxygen-containing ring, or may be introduced into two or more thereof.

In particular, one or more of the substituent groups may be each preferably introduced into the four-or-more-membered oxygen-containing ring. Specifically, when the number of the substituent group is one, the substituent group may be preferably introduced into the four-or-more-membered oxygen-containing ring. When the number of the substituent groups is two or larger, one or more of the substituent groups may be each preferably introduced into the four-or-more-membered oxygen-containing ring. In this case, all of the substituent groups may be each more preferably introduced into the four-or-more-membered oxygen-containing ring, because a higher effect is achieved thereby.

[Specific Examples of Cyclic Ether Compound]

In particular, the cyclic ether compound may preferably include one or more of compounds represented by respective Formulas (4) to (6).

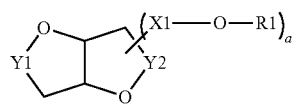

(4)

(X1 is one of a divalent chain saturated hydrocarbon group, a halide group thereof, and nothing. R1 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. a is an integer of 1 or larger. Y1 and Y2 are each one of a divalent chain saturated hydrocarbon group and a halide group thereof. At least one of one or more R1s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.)

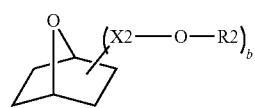

(5)

(X2 is one of a divalent chain saturated hydrocarbon group, a halide group thereof, and nothing. R2 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. b is an integer of 1 or larger. At least one of one or more R2s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.)

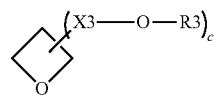

(6)

(X3 is one of a divalent chain saturated hydrocarbon group, a halide group thereof, and nothing. R3 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. c is an integer of 1 or larger. At least one of one or more R3s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.)

The cyclic ether compound represented by Formula (4) includes one of the compounds represented by respective Formulas (2-1) to (2-5) as a skeleton. The skeleton represented by Formula (4) includes two four-or-more-membered oxygen-containing rings, and the oxygen containing rings form a condensed ring together. Each of the oxygen-containing rings is not limited to a five-membered ring, and may be six-or-more-membered ring in some cases, depending on the carbon number of each of Y1 and Y2.

The details of X1 are similar to the details of X described above. The details of R1 are similar to the details of R described above.

Y1 and Y2 may be each, for example, an alkylene group having carbon number from 1 to 4 both inclusive or the like, because compatibility with the cyclic ether compound, etc. are secured thereby. Specific examples of the alkylene group may include a methylene group, an ethylene group, a propylene group, and a butylene group.

A value of "a" that determines the number of the substituent groups is not particularly limited as long as the value of "a" is an integer of 1 or larger.

It is to be noted that, as shown in Formula (4), a position at which the substituent group is introduced into the skeleton is not particularly limited. Specifically, as long as the substituent group is substituted for a hydrogen group in the skeleton, the position of the substituent group may be any position.

The cyclic ether compound represented by Formula (5) is a compound that includes the compound represented by Formula (2-6) as a skeleton. The details of X2, R2, and "b" are similar to the details of X1, R1, and "a" described above, respectively. Further, as with the case described related to Formula (4), the position of the substituent group is not particularly limited.

The cyclic ether compound represented by Formula (6) is a compound that includes the compound represented by Formula (2-1) as a skeleton. The details of X3, R3, and "c" are similar to the details of X1, R1, and "a" described above, respectively. Further, as with the case described related to Formula (4), the position of the substituent group is not particularly limited.

More specifically, the above-described cyclic ether compounds may each preferably include one or more of compounds represented by respective Formulas (7) to (9), because the cyclic ether compound is more easily manufactured thereby, and a further superior advantage is achieved thereby.

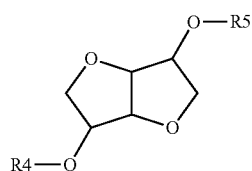

(7)

(R4 and R5 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of R4 and R5 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond.)

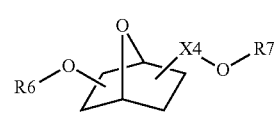

(8)

(X4 is one of a divalent chain saturated hydrocarbon group, a halide group thereof, and nothing. R6 and R7 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of R6 and R7 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond.)

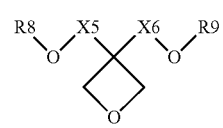

(9)

(X5 and X6 are each one of a divalent chain saturated hydrocarbon group, a halide group thereof, and nothing. R8 and R9 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group. At least one of R8 and R9 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond.)

The cyclic ether compound represented by Formula (7) is a compound in which a shape (five-membered ring) of two oxygen-containing rings included in the skeleton is limited, and the number and the kinds of the substituent groups introduced into the skeleton are limited in the compound represented by Formula (4). The details of each of R5 and R6 are similar to the details of R1 described above.

The cyclic ether compound represented by Formula (8) is a compound in which the number and the kinds of the substituent groups introduced into the skeleton are limited in the compound represented by Formula (5). The details of X4 are similar to the details of X2 described above. The details of each of R6 and R7 are similar to the details of R2 described above.

The cyclic ether compound represented by Formula (9) is a compound in which the number and the positions of the substituent groups introduced into the skeleton are limited in the compound represented by Formula (6). The details of each of X5 and X6 are similar to the details of X3 described above. The details of each of R8 and R9 are similar to the details of R3 described above.

A specific example of the cyclic ether compound may be one or more of compounds represented by respective Formulas (10-1) to (10-15).

Alternatively, a specific example of the cyclic ether compound may be one or more of compounds represented by respective Formulas (11-1) to (11-10).

-continued

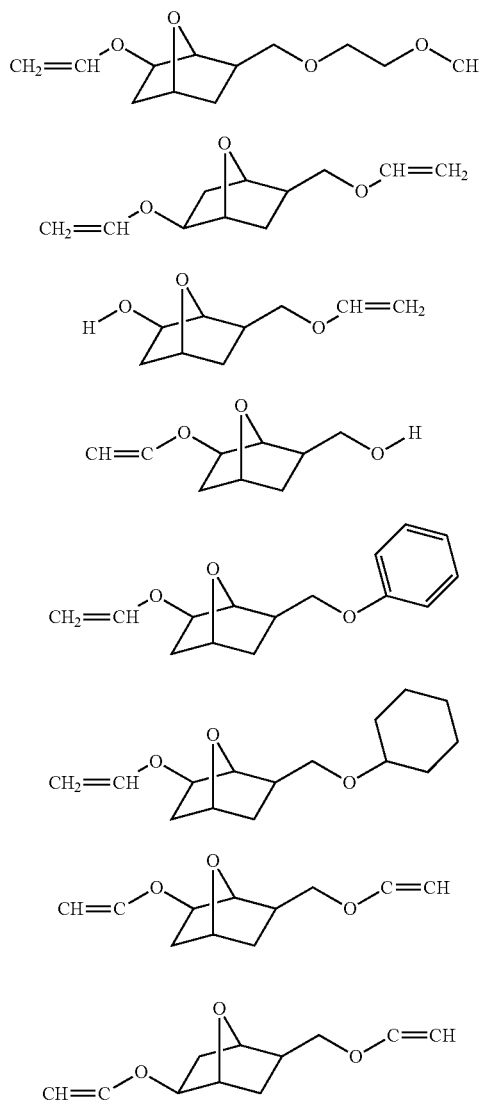

(11-3)
(11-4)
(11-5)
(11-6)
(11-7)
(11-8)
(11-9)
(11-10)

Alternatively, a specific example of the cyclic ether compound may be one or more of compounds represented by respective Formulas (12-1) to (12-6).

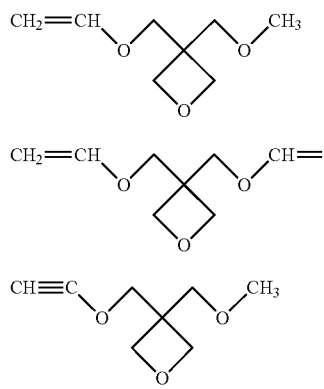

(12-1)
(12-2)
(12-3)

-continued

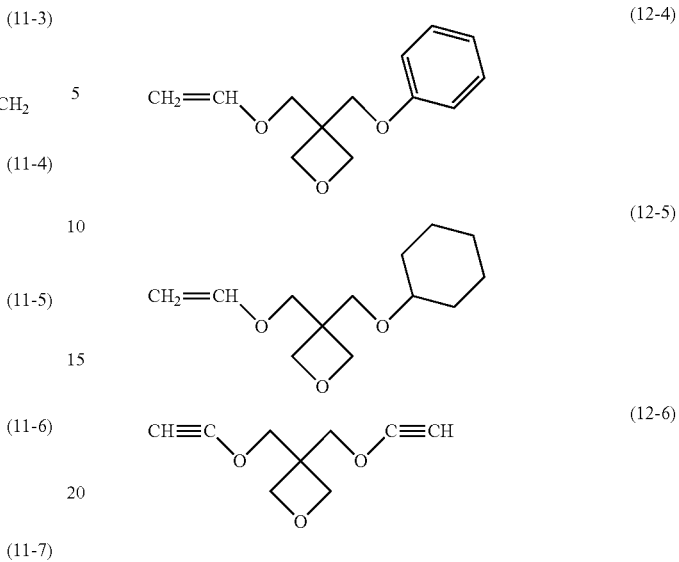

(12-4)
(12-5)
(12-6)

A content of the cyclic ether compound in the electrolytic solution is not particularly limited. However, in particular, the content thereof may be preferably from about 0.01 wt % to about 3 wt % both inclusive, because the above-described advantage is achieved thereby while securing characteristics (such as conductivity) that are naturally demanded for the electrolytic solution. It is to be noted that the content of cyclic ether compound in a case where the electrolytic solution includes two or more cyclic ether compounds refers to sum of contents of the respective cyclic ether compounds.

It is to be noted that, because the cyclic ether compound included in the electrolytic solution includes a carbon-carbon multiple bond, such a cyclic ether compound tends to easily and unintentionally polymerized due to existence of small amount of acid included in the electrolytic solution. The acid may be, for example, proton acid such as hydrogen fluoride (HF), or Lewis acid such as phosphorus pentafluoride ($PF_5$). For this reason, the electrolytic solution may preferably include one or more of polymerization inhibitors in order to suppress a polymerization reaction of the cyclic ether compound. Examples of the polymerization inhibitor may include amines, amides, and nitrogen compounds (such as ureas). Examples of the amines may include trimethylamine, triethylamine, tri-n-propylamine, tri-n-butylamine, tri-iso-butylamine, tri-n-pentylamine, tri-n-hexylamine, tri-n-octylamine, triphenylamine, tribenzylamine, 1-methylpyrrolidine, 1-methylpyrrole, 1-methylpiperidine, pyridine, quinoline, and N, N-dimethylaniline. Examples of the amides may include N, N-dimethylformamide, N, N-dimethylacetamide, N, N-dimethylbenzamide, 1-methyl-2-pyrrolidone, and N-methyl-∈-caprolactam. Examples of the ureas may include 1,1,3,3-tetramethylurea, 1,1,3,3-tetraethylurea, 1,3-dimethyl-2-imidazolidinone, and 1,3-dimetyl-3,4,5,6-tetrahydro-2(1H)-pyrimidinone. A content of the polymerization inhibitor in the electrolytic solution is not particularly limited, but may be preferably from about 0.05 wt % to about 10 wt % both inclusive, for example, because the polymerization reaction of the cyclic ether compound is suppressed thereby with little influence on battery characteristics.

[Other Materials]

The electrolytic solution may include one or more of other materials together with the above-described cyclic ether compound.

The other materials may be, for example, one or more of solvents such as non-aqueous solvent.

Examples of the non-aqueous solvent may include cyclic ester carbonate, chain ester carbonate, lactone, chain carboxylic ester, and nitrile, because superior solubility, compatibility, etc. are obtained thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the chain carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Moreover, examples of the non-aqueous solvent may include 1, 2-dimethoxyethane, tetrahydrofuran, 2-methyltetrahydrofuran, tetrahydropyran, 1,3-dioxolane, 4-methyl-1, 3-dioxolane, 1,3-dioxane, 1,4-dioxane, N, N-dimethylformamide, N-methylpyrrolidone, N-methyloxazolidinone, N,N'-dimethylimidazolidinone, nitromethane, nitroethane, sulfolane, trimethyl phosphate, and dimethylsulfoxide, because a similar advantage is achieved thereby.

In particular, one or more of ethylene carbonate, propylene carbonate, dimethyl carbonate, diethyl carbonate, and ethyl methyl carbonate may be preferable. In this case, a combination of a high viscosity (high dielectric constant) solvent (for example, specific dielectric constant ∈≥30) such as ethylene carbonate or propylene carbonate and a low viscosity solvent (for example, viscosity≤1 mPa·s) such as dimethyl carbonate, ethyl methyl carbonate, or diethyl carbonate may be more preferable. One reason for this is because the dissociation characteristics of the electrolyte salt and ion mobility are thereby improved in the electrolytic solution.

Other than this, the non-aqueous solvent may be one or more of unsaturated cyclic ester carbonates, because a stable protective film is thereby formed on the surface of the electrode at the time of charge and discharge, and the decomposition reaction of the electrolytic solution is therefore suppressed.

The unsaturated cyclic ester carbonate is a cyclic ester carbonate that includes one or more unsaturated bonds (carbon-carbon double bonds). More specifically, the unsaturated cyclic ester carbonate may be one or more of vinylene-carbonate-based compounds represented by Formula (13), vinyl-ethylene-carbonate-based compounds represented by Formula (14), and methylene-ethylene-carbonate-based compounds represented by Formula (15). R21 and R22 may be groups of the same kind, or may be groups of different kinds. The same is applicable to R23 to R26. A content of the unsaturated cyclic ester carbonate in the solvent is not particularly limited, but may be from about 0.01 wt % to about 10 wt % both inclusive, for example. It is to be noted that specific examples of the unsaturated cyclic ester carbonate are not limited to compounds described below.

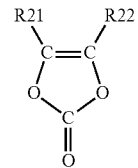

(13)

(R21 and R22 are each one of a hydrogen group and an alkyl group.)

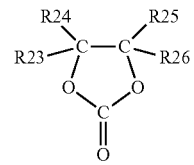

(14)

(R23 to R26 are each one of a hydrogen group, an alkyl group, a vinyl group, and an allyl group, and at least one of R23 to R26 is one of the vinyl group and the allyl group.)

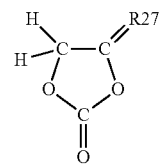

(15)

(R27 is an alkylene group.)

Examples of the vinylene-carbonate-based compound may include vinylene carbonate (1,3-dioxole-2-one), methyl vinylene carbonate (4-methyl-1,3-dioxole-2-one), ethyl vinylene carbonate (4-ethyl-1,3-dioxole-2-one), 4,5-dimethyl-1,3-dioxole-2-one, 4,5-diethyl-1, 3-dioxole-2-one, 4-fluoro-1,3-dioxole-2-one, and 4-trifluoromethyl-1,3-dioxole-2-one. In particular, vinylene carbonate may be preferable, because vinylene carbonate is easily available, and achieves a high effect.

Examples of the vinyl-ethylene-carbonate-based compound may include vinyl-ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1, 3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate may be preferable, because vinyl ethylene carbonate is easily available, and achieves a high effect. It goes without saying that as R32 to R35, all of them may be vinyl groups, all of them may be allyl groups, and vinyl groups and allyl groups may be coexist.

Examples of the methylene-ethylene-carbonate-based compound may include methylene ethylene carbonate (4-methylene-1,3-dioxolane-2-one), 4,4-dimehyl-5-methylene-1, 3-dioxolane-2-one, and 4,4-diethyl-5-methylene-1,3-dioxolane-2-one. The methylene-ethylene-carbonate-based compound may be a compound that has two methylene groups, other than a compound that has one methylene group as represented by Formula (15). It is to be noted that R27 may be a divalent group represented by >CR$_2$ (R is an alkyl group).

Other than above, the unsaturated cyclic ester carbonate may be, for example, catechol carbonate that has a benzene ring, or the like.

Moreover, the non-aqueous solvent may be one or more of halogenated ester carbonates, because a stable protective film is thereby formed on the surface of the electrode at the time of charge and discharge, and the decomposition reaction of the electrolytic solution is therefore suppressed. The halogenated ester carbonate is cyclic or chain ester carbonate that includes one or more halogens as constituent elements. More specifically, the cyclic halogenated ester carbonate may be a compound represented by Formula (16), and the chain halogenated ester carbonate may be a compound represented by Formula (17). R28 to R31 may be groups of the same kind, or may be groups of different kinds. Part of R28 to R31 may be groups of the same kind. This is also applicable to R32 to R37. A content of the halogenated ester carbonate in the solvent is not particularly limited, but may be from about 0.01 wt % to about 50 wt % both inclusive, for example. It is to be noted that specific examples of the halogenated ester carbonate is not limited to compounds described below.

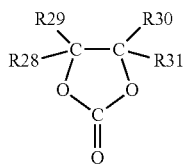
(16)

(R28 to R31 are each one of a hydrogen group, a halogen group, an alkyl group, and a halogenated alkyl group, and at least one of R28 to R31 is one of the halogen group and the halogenated alkyl group.)

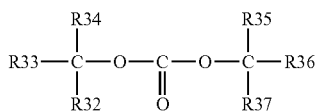
(17)

(R32 to R37 are each one of a hydrogen group, a halogen group, an alkyl group, and a halogenated alkyl group, and at least one of R32 to R37 is one of the halogen group and the halogenated alkyl group.)

The kind of the halogen is not particularly limited. However, in particular, one or more of fluorine, chlorine, bromine, and iodine may be preferable, and fluorine may be more preferable because a higher effect is achieved thereby compared to other halogens. It is to be noted that the number of halogens may be preferably two than one, and may be three or more. One reason for this is because ability of forming a protective film is increased thereby and more rigid and stable protective film is formed, which further suppresses the decomposition reaction of the electrolytic solution.

Examples of the cyclic halogenated ester carbonate may include compounds represented by respective Formulas (16-1) to (16-21) below, which includes geometric isomers. In particular, 4-fluoro-1,3-dioxolane-2-one represented by Formula (16-1) or 4,5-difluoro-1,3-dioxolane-2-one represented by Formula (16-3) may be preferable, and the latter may be more preferable. Moreover, as 4,5-difluoro-1,3-dioxolane-2-one, a trans-isomer may be more preferable than a cis-isomer, because the trans-isomer thereof is easily available, and achieves a high effect. On the other hand, examples of the chain halogenated ester carbonate may include fluoromethylmethyl carbonate, bis (fluoromethyl) carbonate, and difluoromethyl methyl carbonate.

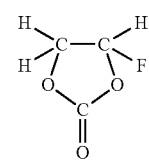
(16-1)

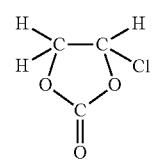
(16-2)

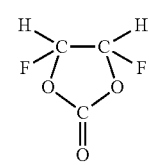
(16-3)

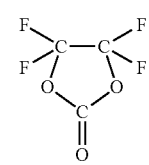
(16-4)

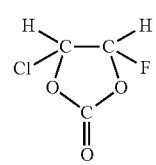
(16-5)

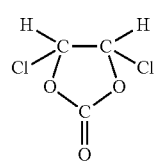
(16-6)

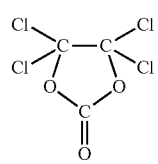
(16-7)

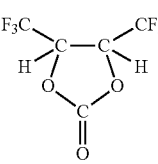
(16-8)

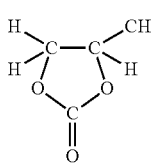
(16-9)

(16-10) 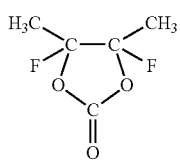

(16-11) 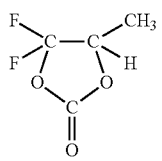

(16-12) 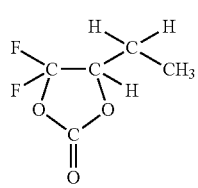

(16-13) 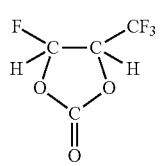

(16-14) 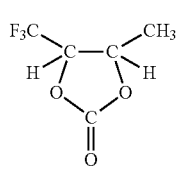

(16-15) 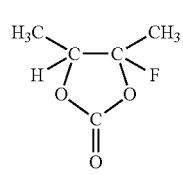

(16-16) 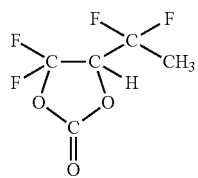

(16-17) 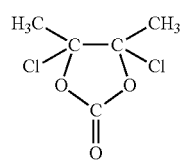

(16-18) 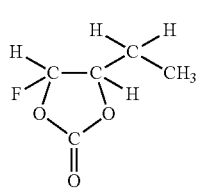

(16-19) 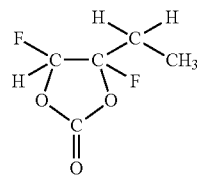

(16-20) 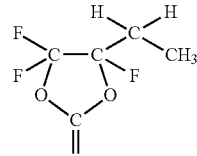

(16-21) 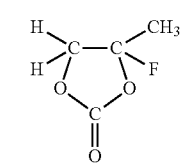

Moreover, the non-aqueous solvent may be sultone (cyclic ester sulfonate), because chemical stability of the electrolytic solution is thereby improved. Examples of the sultone may include propane sultone and propene sultone. A content of the sultone in the solvent is not particularly limited, but may be from about 0.5 wt % to about 5 wt % both inclusive, for example. It is to be noted that specific examples of the sultone are not limited to the compounds described above.

Moreover, the non-aqueous solvent may be acid anhydride, because chemical stability of the electrolytic solution is further improved thereby. Examples of the acid anhydride may include carboxylic anhydride, disulfonic anhydride, and carboxylic sulfonic anhydride. Examples of the carboxylic anhydride may include succinic anhydride, glutaric anhydride, and maleic anhydride. Examples of the disulfonic anhydride may include ethane disulfonic anhydride and propane disulfonic anhydride. Examples of the carboxylic sulfonic anhydride may include sulfobenzoic anhydride, sulfopropionic anhydride, and sulfobutyric anhydride. A content of the acid anhydride in the solvent is not particularly limited, but may be from about 0.5 wt % to about 5 wt % both inclusive, for example. It is to be noted that specific examples of the acid anhydride are not limited to the compounds described above.

[Electrolyte Salt]

The electrolyte salt may contain, for example, one or more of salts such as lithium salt. However, the electrolyte salt may contain, for example, salt other than the lithium salt. Examples of "salt other than the lithium salt" may include light metal salt other than lithium salt.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), because superior battery capacity, superior cycle characteristics, superior conservation characteristics, and the like are thereby achieved. However, specific examples of the lithium salt are not limited to the compounds described above.

In particular, one or more of $LiPF_6$, $LiBF_4$, $LiClO_4$, and $LiAsF_6$ may be preferable, and $LiPF_6$ may be more preferable, because the internal resistance is thereby lowered, and a higher effect is achieved.

In particular, the lithium salt may be one or more of compounds represented by respective Formulas (18) to (20), because a higher effect is achieved thereby. It is to be noted that R41 and R43 may be groups of the same kind, or may be groups of different kinds. This is similarly applicable also to R51 to R53, and to R61 and R62. It is to be noted that specific examples of the compounds represented by respective Formulas (18) to (20) are not limited to compounds described below.

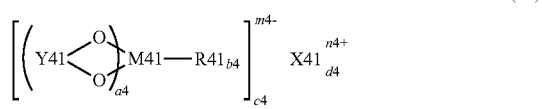

(18)

(X41 is one of Group 1 elements and Group 2 elements in a long form of periodic table, and aluminum. M 41 is one of transition metal, Group 13 elements, Group 14 elements, and Group 15 elements in the long form of the periodic table. R41 is a halogen group. Y41 is one of —C(=O)—R42-C(=O)—, —C(=O)—CR43$_2$-, and —C(=O)—C(=O)—. R42 is one of an alkylene group, a halogenated alkylene group, an arylene group, and a halogenated arylene group. R43 is one of an alkyl group, a halogenated alkyl group, an aryl group, and a halogenated aryl group. a4 is an integer from 1 to 4 both inclusive. b4 is an integer of one of 0, 2, and 4. c4, d4, m4, and n4 may each be an integer from 1 to 3 both inclusive.)

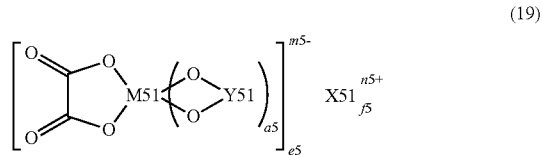

(19)

(X51 is one of Group 1 elements and Group 2 elements in the long form of the periodic table. M51 is one of transition metal, Group 13 elements, Group 14 elements, and Group 15 elements in the long form of the periodic table. Y51 is one of —C(=O)—(CR51$_2$)$_{b5}$—C(=O)—, —R53$_2$C—(CR52$_2$)$_{c5}$—C(=O)—, —R53$_2$C—(CR52$_2$)$_{c5}$—CR53$_2$—, —R53$_2$C—(CR52$_2$)$_{c5}$—S(=O)$_2$, —S(=O)$_2$—(CR52$_2$)$_{d5}$—S(=O)$_2$—, and —C(=O)—(CR52$_2$)$_{d5}$—S(=O)$_2$—. R51 and R53 are each one of a hydrogen group, an alkyl group, a halogen group, and a halogenated alkyl group. At least one R51 is one of the halogen group and the halogenated alkyl group. At least one R53 is one of the halogen group and the halogenated alkyl group. R52 is one of a hydrogen group, an alkyl group, a halogen group, and a halogenated alkyl group. a5, e5, and n5 are each an integer of one of 1 and 2. b5 and d5 are each an integer from 1 to 4 both inclusive. c5 is an integer from 0 to 4 both inclusive. f5 and m5 are each one of an integer from 1 to 3 both inclusive.)

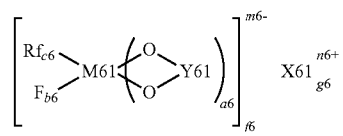

(20)

(X61 is one of Group 1 elements and Group 2 elements in the long form of the periodic table. M61 is one of transition metal, Group 13 elements, Group 14 elements, and Group 15 elements in the long form of the periodic table. Rf is one of a fluorinated alkyl group and a fluorinated aryl group that have carbon number from 1 to 10 both inclusive. Y61 is one of —C(=O)—(CR61$_2$)$_{d6}$—C(=O)—, —R62$_2$C—(CR61$_2$)$_{d6}$—C(=O)—, —R62$_2$C—(CR61$_2$)$_{d6}$—CR62$_2$—, —R62$_2$C—(CR61$_2$)$_{d6}$—S(=O)$_2$—, —S(=O)$_2$—(CR61$_2$)$_{e6}$—S(=O)$_2$—, and —C(=O)—(CR61$_2$)$_{e6}$—S(=O)$_2$—. R61 is one of a hydrogen group, an alkyl group, a halogen group, and a halogenated alkyl group. R62 is one of a hydrogen group, an alkyl group, a halogen group, and a halogenated alkyl group. At least one R62 is one of the halogen group and the halogenated alkyl group. a6, f6, and n6 are each an integer of one of 1 and 2. b6, c6, and e6 are each an integer from 1 to 4 both inclusive. d6 is an integer from 0 to 4 both inclusive. g6 and m6 are each an integer from 1 to 3 both inclusive.)

It is to be noted that Group 1 elements are H, Li, Na, K, Rb, Cs, and Fr. Group 2 elements are Be, Mg, Ca, Sr, Ba, and Ra. Group 13 elements are B, Al, Ga, In, and Tl. Group 14 elements are C, Si, Ge, Sn, and Pb. Group 15 elements are N, P, As, Sb, and Bi.

Examples of the compound represented by Formula (18) may include compounds represented by respective Formulas (18-1) to (18-6). Examples of the compound represented by Formula (19) may include compounds represented by respective Formulas (19-1) to (19-8). Examples of the compound represented by Formula (20) may include a compound represented by Formula (20-1).

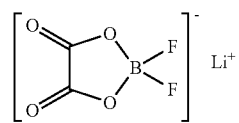

(18-1)

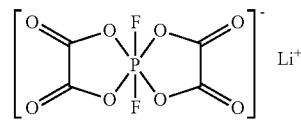

(18-2)

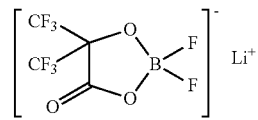

(18-3)

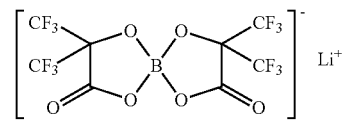

(18-4)

-continued

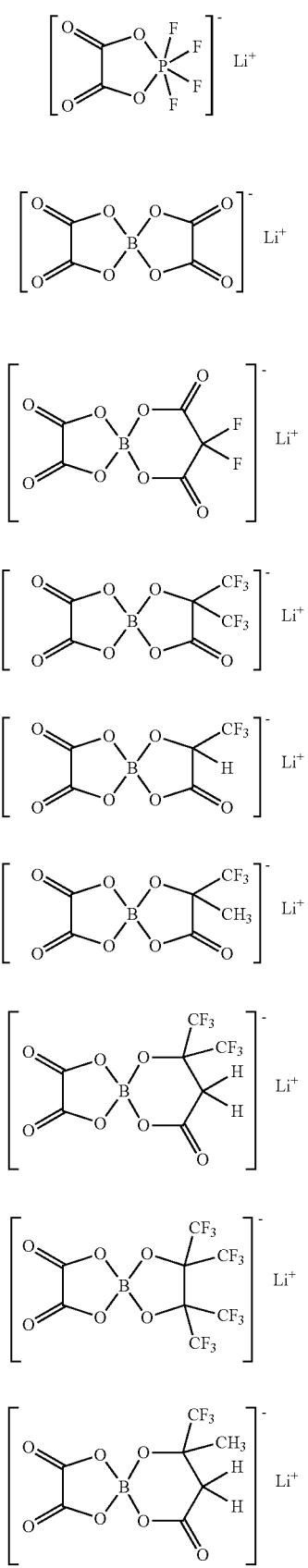

(18-5)

(18-6)

(19-1)

(19-2)

(19-3)

(19-4)

(19-5)

(19-6)

(19-7)

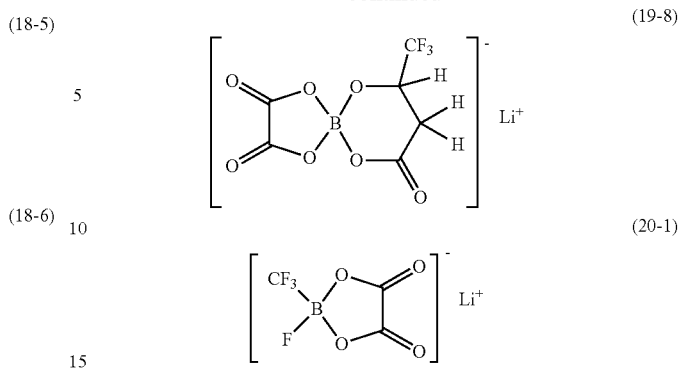

(19-8)

(20-1)

Moreover, the lithium salt may be one or more of a chain imide compound represented by Formula (21), a cyclic imide compound represented by Formula (22), and a chain methide compound represented by Formula (23), because a higher effect is achieved thereby. It is to be noted that m and n may be the same value, or may be different values. This is similarly applicable also to p, q, and r. It is to be noted that specific examples of the compounds represented by respective Formulas (21) to (23) are not limited to compounds described below.

$$LiN(C_mF_{2m+1}SO_2)(C_nF_{2n+1}SO_2) \qquad (21)$$

(m and n are each an integer of 1 or larger.)

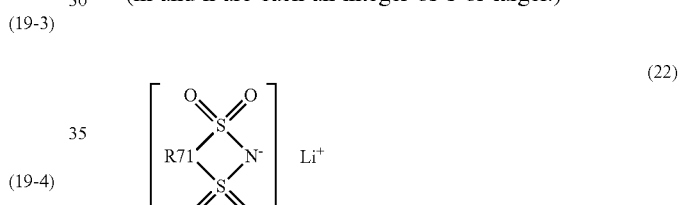

(22)

(R71 is a linear or branched perfluoroalkylene group having carbon number from 2 to 4 both inclusive.)

$$LiC(C_pF_{2p+1}SO_2)(C_qF_{2q+1}SO_2)(CrF_{2r+1}SO_2) \qquad (23)$$

(p, q, and r are each an integer of 1 or larger.)

Examples of the chain imide compound may include bis (trifluoromethanesulfonyl) imide lithium ($LiN(CF_3SO_2)_2$), bis (pentafluoroethanesulfonyl) imide lithium ($LiN(C_2F_5SO_2)_2$), (trifluoromethanesulfonyl) (pentafluoroethanesulfonyl) imide lithium ($LiN(CF_3SO_2)(C_2F_5SO_2)$), (trifluoromethansulfonyl) (heptafluoropropanesulfonyl) imide lithium ($LiN(CF_3SO_2)(C_3F_7SO_2)$), and (trifluoromethanesulfonyl) (nonafluorobuthanesulfonyl) imide lithium ($LiN(CF_3SO_2)(C_4F_9SO_2)$).

Examples of the cyclic imide compound may include compounds represented by respective Formulas (22-1) to (22-4).

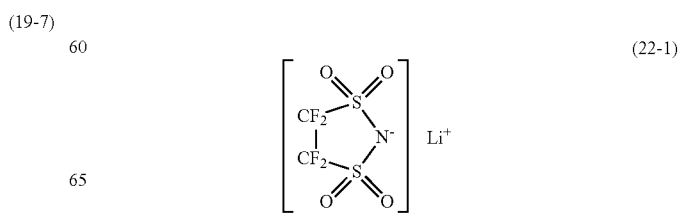

(22-1)

-continued

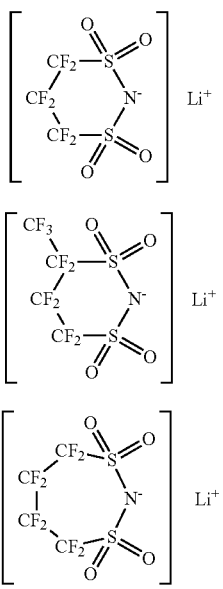

(22-2)

(22-3)

(22-4)

Examples of the chain methide compound may include lithium tris (trifluoromethanesulfonyl) methide (LiC($CF_3SO_2$)$_3$).

A content of the electrolyte salt is not particularly limited, but in particular, may be preferably from about 0.3 mol/kg to about 3.0 mol/kg both inclusive with respect to the solvent, for example, because high ion conductivity is achieved thereby.

[Method of Manufacturing Electrolytic Solution]

When manufacturing the electrolytic solution, for example, the cyclic ether compound may be mixed with other materials such as the non-aqueous solvent and the electrolyte salt as necessary, and thereafter, the mixture may be stirred.

[Functions and Effects of Electrolytic Solution]

The electrolytic solution of an embodiment of the present application includes the above-described cyclic ether compound. In this case, the decomposition reaction of the electrolytic solution is suppressed while maintaining mobility of the electrode reactant, and increase in resistance of the coating film is suppressed, compared to a case where the electrolytic solution includes no cyclic ether compound, and a case where the electrolytic solution include a compound other than the cyclic ether compound. As a result, it is possible to improve battery characteristics of the secondary battery that uses the electrolytic solution.

It is to be noted that "other compound" described above is a compound that has a chemical structure that is similar to that of the cyclic ether compound. Specific examples thereof may include compounds represented by respective Formulas (24-1) to (24-6) below.

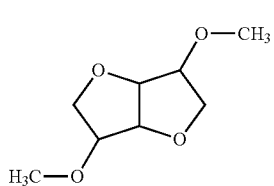

(24-1)

-continued

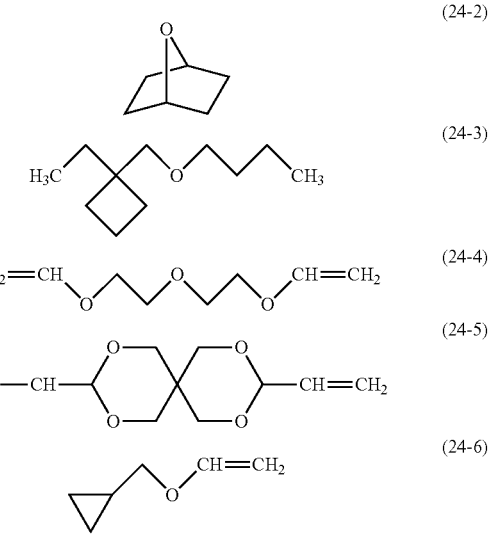

(24-2)

(24-3)

(24-4)

(24-5)

(24-6)

One reason that these other compounds do not belong to the cyclic ether compound is as follows. The compound represented by Formula (24-1) includes no monovalent chain unsaturated hydrocarbon group as R. The compound represented by Formula (24-2) includes no substituent group. In the compound represented by Formula (24-3), a carbon-carbon multiple bond is not bonded to an ether bond. The compound represented by Formula (24-4) includes no four-or-more-membered oxygen-containing ring. The compound represented by Formula (24-5) includes four-or-more-membered oxygen-containing rings, but a carbon-carbon multiple bond therein is not bonded to an ether bond. The compound represented by Formula (24-6) includes no four-or-more-membered oxygen-containing ring.

In the electrolytic solution of the present application, when at least one substituent group is introduced into the four-or-more-membered oxygen-containing ring, a higher effect is achieved. Moreover, in a case where the number of the substituent groups is two or larger, when all of the two or more Rs each include the monovalent chain unsaturated hydrocarbon group or the like, and each include a carbon-carbon multiple bond bonded to an ether bond, a higher effect is achieved.

Moreover, when the cyclic ether compound is one or more of the compounds represented by respective Formulas (4) to (6), or is one or more of the compounds represented by respective Formulas (7) to (9), a higher effect is achieved.

Moreover, when the cyclic ether compound is one or more of the compounds represented by respective Formulas (10-1) to (10-15), (11-1) to (11-10), and (12-1) to (12-6), a further higher effect is achieved.

Other than above, when the content of the cyclic ether compound in the electrolytic solution is from about 0.01 wt % to about 3 wt % both inclusive, a higher effect is achieved.

[2. Secondary Battery Using Non-aqueous Electrolytic Solution]

Next, a secondary battery that uses the above-described electrolytic solution is described.

[2-1. Lithium Ion Secondary Battery (Cylindrical Type)]

Figure 2:
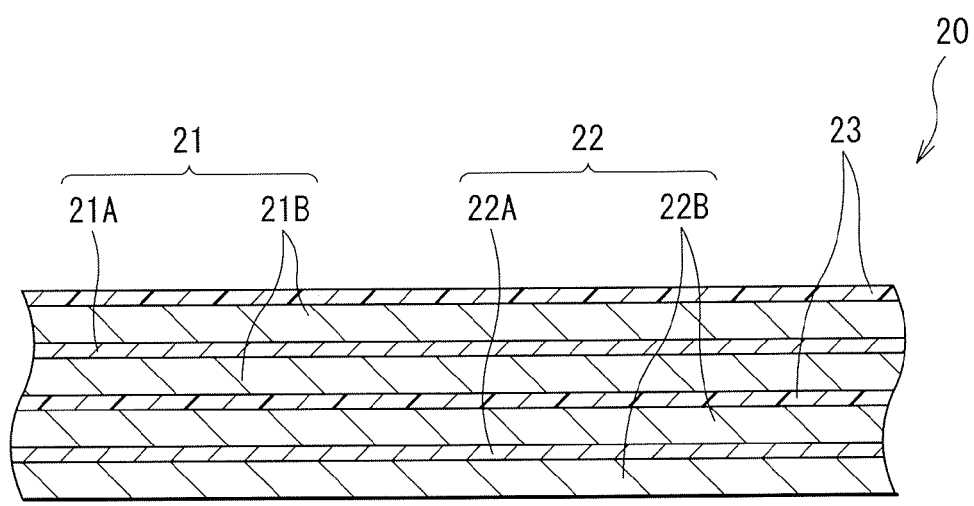
FIG. 2 is a cross-sectional view illustrating an enlarged part of a spirally wound electrode body illustrated in FIG. 1.

FIG. 1 and FIG. 2 each illustrate a cross-sectional configuration of a secondary battery of an embodiment of the present application. FIG. 2 illustrates an enlarged part of a spirally wound electrode body 20 illustrated in FIG. 1.

[General Configuration of Secondary Battery]

The secondary battery described here is a lithium secondary battery (a lithium ion secondary battery) in which a capacity of an anode 22 is obtained by insertion and extraction of lithium as an electrode reactant.

The secondary battery may be, for example, a secondary battery of a so-called cylindrical type. The secondary battery may contain a pair of insulating plates 12 and 13 and a spirally wound electrode body 20 inside a battery can 11 in the shape of a substantially-hollow cylinder. In the spirally wound electrode body 20, for example, a cathode 21 and the anode 22 are laminated with a separator 23 in between and are spirally wound.

The battery can 11 may have a hollow structure in which one end of the battery can 11 is closed and the other end of the battery can 11 is opened. The battery can 11 may be made, for example, of iron (Fe), aluminum (Al), alloy thereof, or the like. The surface of the battery can 11 may be plated with nickel (Ni) or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to that of the battery can 11. The safety valve mechanism 15 and the PTC device 16 are provided inside the battery cover 14. The safety valve mechanism 15 is electrically connected to the battery cover 14 via the PTC device 16. In the safety valve mechanism 15, in the case where the internal pressure becomes a certain level or higher by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made, for example, of an insulating material. The surface of the gasket 17 may be coated with asphalt.

In the center of the spirally wound electrode body 20, for example, a center pin 24 may be inserted. However, the center pin 24 may not be inserted in the center of the spirally wound electrode body 20. For example, a cathode lead 25 made of a conductive material such as aluminum may be connected to the cathode 21. For example, an anode lead 26 made of a conductive material such as nickel may be connected to the anode 22. For example, the cathode lead 25 may be attached to the safety valve mechanism 15 by welding or the like, and may be electrically connected to the battery cover 14. For example, the anode lead 26 may be attached to the battery can 11 by welding or the like, and may be electrically connected to the battery can 11.

[Cathode]

The cathode 21 has a cathode active material layer 21B on a single surface or both surfaces of a cathode current collector 21A. The cathode current collector 21A may be made, for example, of a conductive material such as aluminum, nickel, or stainless steel.

The cathode active material layer 21B contains, as a cathode active material, one or more of cathode materials capable of inserting and extracting lithium. It is to be noted that the cathode active material layer 21B may further contain one or more of other materials such as a cathode binder and a cathode electric conductor.

The cathode material may be preferably a lithium-containing compound, because high energy density is obtained thereby. Examples of the lithium-containing compound may include a lithium-transition-metal composite oxide and a lithium-transition-metal-phosphate compound. The lithium-transition-metal composite oxide is an oxide containing lithium and one or more transition metal elements as constituent elements. The lithium-transition-metal-phosphate compound is a phosphate compound containing lithium and one or more transition metal elements as constituent elements. In particular, the transition metal element may be preferably one or more of cobalt (Co), nickel, manganese (Mn), iron (Fe), and the like, because a higher voltage is obtained thereby. The chemical formula thereof may be expressed, for example, by $Li_xM1O_2$ or $Li_yM2PO_4$. In the formulas, M1 and M2 represent one or more transition metal elements. Values of x and y vary according to the charge and discharge state, but may be generally in the range of $0.05 \leq x \leq 1.10$ and $0.05 \leq y \leq 1.10$.

Examples of the lithium-transition-metal composite oxide may include $LiCoO_2$, $LiNiO_2$, and a lithium-nickel-based composite oxide represented by Formula (30). Specific examples of the lithium-transition-metal-phosphate compound may include $LiFePO_4$ and $LiFe_{1-u}Mn_uPO_4$ (u<1), because a high battery capacity is thereby obtained and superior cycle characteristics are also obtained.

$$LiNi_{1-z}M_zO_2 \qquad (30)$$

(M is one or more of cobalt, manganese, iron, aluminum, vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper, zinc (Zn), barium (Ba), boron (B), chromium (Cr), silicon (Si), gallium (Ga), phosphorus (P), antimony (Sb), and niobium (Nb). z satisfies $0.005 < z < 0.5$.)

Other than the above-described materials, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. However, the cathode material may be a material other than the above-mentioned materials.

The cathode binder may include, for example, one or more of synthetic rubbers, polymer materials, and the like. Examples of the synthetic rubber may include styrene-butadiene-based rubber, a fluorine-based rubber, and ethylene propylene diene. Examples of the polymer material may include polyvinylidene fluoride and polyimide. A crystal structure of polyvinylidene fluoride used as the polymer material is not particularly limited.

Examples of the cathode electric conductor may include one or more of carbon materials and the like. Examples of the carbon material may include graphite, carbon black, acetylene black, and Ketjen black. The cathode electric conductor may be a metal material, a conductive polymer, or the like as long as the material has electric conductivity.

[Anode]

The anode 22 has an anode active material layer 22B on a single surface or both surfaces of an anode current collector 22A.

The anode current collector 22A may include, for example, one or more of electrically-conductive materials such as copper, nickel, and stainless steel. The surface of the anode current collector 22A may be preferably roughened. Thereby, due to a so-called anchor effect, close-attachment characteristics of the anode active material layer 22B with respect to the anode current collector 22A are improved. In this case, it is enough that the surface of the anode current collector 22A in a region opposed to the anode active material layer 22B is roughened at minimum. Examples of roughening methods may include a method of forming fine particles by utilizing an electrolytic treatment. The electrolytic treatment is a method of forming the fine particles on the surface of the anode current collector 22A with the use of an electrolytic method in an electrolytic bath to provide concavities and convexities on the surface of the anode current collector 22A. A copper foil fabricated by an electrolytic method is generally called "electrolytic copper foil."

The anode active material layer 22B contains one or more of anode materials capable of inserting and extracting lithium as anode active materials. However, the anode active material layer 22B may further contain one or more of other materials such as an anode binder and an anode electric conductor. The details of the anode binder and the anode electric conductor may be, for example, similar to the details of the cathode binder and the cathode electric conductor.

However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium may be preferably larger than the electrochemical equivalent of the cathode 21.

The anode material may be, for example, one or more of carbon materials, because, in the carbon material, its crystal structure change at the time of insertion and extraction of lithium is extremely small, and high energy density is stably achieved. Further, the carbon material serves as an anode electric conductor as well, which improves electrical conductivity of the anode active material layer 22B.

Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as phenol resin and furan resin at appropriate temperature. In addition thereto, the carbon material may be low crystalline carbon heat-treated at temperature of about 1000 deg C. or less, or may be amorphous carbon. It is to be noted that the shape of the carbon material may be any of a fibrous shape, a spherical shape, a granular shape, and a scale-like shape.

Moreover, the anode material may be, for example, a material (a metal-based material) containing one or more of metal elements and metalloid elements as constituent elements, because high energy density is thereby achieved.

The metal-based material may be a simple substance, alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming alloy with lithium. Specific examples thereof may include magnesium, boron, aluminum, gallium, indium (In), silicon, germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable, because silicon and tin have superior ability of inserting and extracting lithium, and therefore achieve high energy density.

A material containing silicon, tin, or both as constituent elements may be any of a simple substance, alloy, and a compound of silicon, may be any of a simple substance, alloy, and a compound of tin, may be two or more thereof, or may have one or more phases thereof in part or all thereof. It is to be noted that "simple substance" described herein merely refers to a simple substance in a general sense (a small amount of impurity may be therein contained), and does not necessarily refer to a purity 100% simple substance.

The alloys of silicon may contain, for example, one or more of elements such as tin, nickel, copper, iron, cobalt, manganese, zinc, indium, silver, titanium, germanium, bismuth, antimony, and chromium, as a constituent element other than silicon. The compounds of silicon may contain, for example, one or more of carbon (C), oxygen (O), and the like as constituent elements other than Si. It is to be noted that the compounds of silicon may contain, for example, one or more of the series of elements described for the alloys of silicon, as constituent elements other than silicon.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi$, $NbSi_2$, $TaSi_2$, $VSi_2$, $WSi_2$, $ZnSi_2$, $SiC$, $Si_3N_4$, $Si_2N_2O$, $SiO_v$, ($0<v\leq2$), and LiSiO. v in $SiO_v$ may be in a range of $0.2<v<1.4$.

The alloys of tin may contain, for example, one or more of elements such as silicon, nickel, copper, iron, cobalt, manganese, zinc, indium, silver, titanium, germanium, bismuth, antimony, and chromium, as constituent elements other than tin. The compounds of tin may contain, for example, one or more of elements such as carbon and oxygen as constituent elements other than tin. It is to be noted that the compounds of tin may contain, for example, one or more of the series of elements described for the alloys of tin, as constituent elements other than tin.

Specific examples of the alloys of tin and the compounds of tin may include $SnO_w$ ($0<w\leq2$), $SnSiO_3$, $LiSnO$, and $Mg_2Sn$.

In particular, the material containing tin as a constituent element may be preferably, for example, a material containing a second constituent element and a third constituent element in addition to tin (a first constituent element). Examples of the second constituent element may include one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. Examples of the third constituent element may include one or more of elements such as boron, carbon, aluminum, and phosphorus. One reason for this is because high battery capacity, superior cycle characteristics, and the like are achieved by containing the second and third constituent elements.

In particular, a material (SnCoC-containing material) containing tin, cobalt, and carbon as constituent elements may be preferable. In the SnCoC-containing material, for example, the content of carbon may be from about 9.9 mass % to about 29.7 mass % both inclusive, and the ratio of contents of tin and cobalt (Co/(Sn+Co)) may be from about 20 mass % to about 70 mass % both inclusive, because high energy density is achieved thereby.

The SnCoC-containing material may preferably have a phase containing tin, cobalt, and carbon. Such a phase may be preferably low-crystalline or amorphous. The phase is a reaction phase capable of reacting with lithium. Therefore, due to existence of the reaction phase, superior characteristics are achieved. A half bandwidth (a diffraction angle 2θ) of a diffraction peak obtained by X-ray diffraction of the reaction phase may be preferably equal to or larger than 1 deg in a case where CuKα ray is used as a specific X ray, and the insertion rate is 1 deg/min. One reason for this is because lithium is more smoothly inserted and extracted thereby, and reactivity with the electrolytic solution is decreased. It is to be noted that, in some cases, the SnCoC-containing material may include a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in a range of 2θ=from about 20 deg to about 50 deg both inclusive. Such a reaction phase may include, for example, the foregoing respective constituent elements, and it may be considered that the low crystalline or amorphous structure thereof may result mainly from the existence of carbon.

In the SnCoC-containing material, part or all of carbon as a constituent element may be preferably bonded to a metal element or a metalloid element as other constituent element, because cohesion or crystallization of tin and/or the like is suppressed thereby. The bonding state of elements is allowed to be checked, for example, by XPS. In a commercially-available device, for example, Al-Kα ray, Mg-Kα ray, or the like may be used as a soft X ray. In the case where part or all of carbons are bonded to a metal element, a metalloid element, or the like, the peak of a synthetic wave of 1s orbit of carbon (C1s) appears in a region lower than 284.5 eV. It is to be noted that energy calibration is made so that the peak of 4f orbit (Au4f) of gold atom is obtained in 84.0 eV. At this time, in general, because surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is considered the energy standard (284.8 eV).

The SnCoC-containing material is not limited to the material (SnCoC) configured of only tin, cobalt, and carbon as constituent elements. The SnCoC-containing material may further contain, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) containing tin, cobalt, iron, and carbon as constituent elements may be also preferable. The composition of the SnCoFeC-containing material may be any composition. To give an example, when the content of iron is set small, the content of carbon may be from about 9.9 mass % to about 29.7 mass % both inclusive, the content of iron may be from about 0.3 mass % to about 5.9 mass % both inclusive, and the ratio of contents of tin and cobalt (Co/(Sn+Co)) may be from about 30 mass % to about 70 mass % both inclusive. Alternatively, when the content of iron is set larger, the content of carbon is from about 11.9 mass % to about 29.7 mass % both inclusive, the ratio of contents of tin, cobalt, and iron ((Co+Fe)/(Sn+Co+Fe)) is from about 26.4 mass % to about 48.5 mass % both inclusive, and the ratio of contents of cobalt and iron (Co/(Co+Fe)) is from about 9.9 mass % to about 79.5 mass % both inclusive. One reason for this is because, in such a composition range, high energy density is achieved. The physical characteristics (such as a half bandwidth) of the SnCoFeC-containing material are similar to those of the SnCoC-containing material described above.

Other than the above-mentioned materials, the anode material may be, for example, one or more of metal oxide, a polymer compound, and the like. Examples of the metal oxide may include iron oxide, ruthenium oxide, and molybdenum oxide. Examples of the polymer compound may include polyacetylene, polyaniline, and polypyrrole.

In particular, the anode material may preferably include both of the carbon material and the metal-based material for the following reason.

The metal-based material, in particular, a material that includes one or both of silicon and tin as constituent elements has an advantage of high theoretical capacity, but on the other hand, has a concern that such a material is easily and radically expanded or contracted upon an electrode reaction. On the other hand, the carbon material has a concern of low theoretical capacity, but has an advantage that the carbon material is difficult to be expanded or contracted upon an electrode reaction. For this reason, by using both of the carbon material and the metal-based material, expansion and contraction upon an electrode reaction are suppressed while achieving high theoretical capacity (in other words, battery capacity).

The anode active material layer 22B may be formed, for example, by one or more of a coating method, a vapor-phase deposition method, a liquid-phase deposition method, a spraying method, and a firing method (sintering method). The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated with the mixture dispersed in the solvent by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted accordingly. Thereby, high energy density is achievable.

[Separator]

The separator 23 separates the cathode 21 from the anode 22, and passes lithium ions while preventing current short circuit resulting from contact of both electrodes. The separator 23 may be, for example, a porous film made of synthetic resin, ceramics, or the like. The separator 23 may be a laminated film in which two or more of porous films are laminated. Examples of the synthetic resin may include polytetrafluoroethylene, polypropylene, and polyethylene.

In particular, the separator 23 may include, for example, the above-described porous film (the base material layer), and a polymer compound layer provided on one surface or both surfaces of the base material layer. One reason for this is because, thereby, close attachment characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are performed repeatedly, the resistance is less likely to be increased, and battery swollenness is suppressed.

The polymer compound layer may contain, for example, a polymer material such as polyvinylidene fluoride, because such a polymer material has superior physical strength and is electrochemically stable. However, the polymer material may be a material other than polyvinylidene fluoride. The polymer compound layer may be formed as follows, for example. That is, after solution in which the polymer material is dissolved is prepared, the base material layer is coated with the solution, and the resultant is subsequently dried. Alternatively, the base material layer may be soaked in the solution and may be subsequently dried.

[Electrolytic Solution]

The spirally wound electrode body 20 is impregnated with electrolytic solution as a liquid electrolyte. A configuration of this electrolytic solution is similar to the configuration of the electrolytic solution of the embodiment of the present application.

[Operation of Secondary Battery]

The secondary battery may operate, for example, as follows. At the time of charge, lithium ions extracted from the cathode 21 may be inserted in the anode 22 through the electrolytic solution. At the time of discharge, lithium ions extracted from the anode 22 may be inserted in the cathode 21 through the electrolytic solution.

[Method of Manufacturing Secondary Battery]

The secondary battery may be manufactured, for example, by the following procedure.

When fabricating the cathode 21, first, the cathode active material is mixed with the cathode binder, the cathode electric conductor, and/or the like as necessary to obtain a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded with the use of a roll pressing machine and/or the like while heating as necessary. In this case, compression-molding may be repeated several times.

When fabricating the anode 22, the anode active material layer 22B is formed on the anode current collector 22A by a procedure similar to that of the cathode 21 described above. Specifically, the anode active material is mixed with the anode binder, the anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded with the use of a roll pressing machine and/or the like.

When assembling the secondary battery using the cathode 21 and the anode 22, the cathode lead 25 is attached to the cathode current collector 21A by a welding method and/or the like, and the anode lead 26 is attached to the anode current collector 22A by a welding method and/or the like. Subsequently, the cathode 21 and the anode 22 are laminated with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Functions and Effects of Secondary Battery]

According to the cylindrical-type secondary battery, the electrolytic solution has a configuration similar to the configuration of the electrolytic solution of the embodiment of the present application. Accordingly, as described above, the decomposition reaction of the electrolytic solution is suppressed while maintaining mobility of lithium ion, and increase in resistance of the coating film is suppressed. This causes the discharge capacity to be less likely to be decreased, and causes gas to be less likely to be generated, even charge and discharge are performed repeatedly. As a result, superior battery characteristics are achieved. Functions and effects other than above are similar to those of the electrolytic solution of the embodiment of the present application.

[2-2. Lithium Ion Secondary Battery (Laminated Film Type)]

Figure 3:
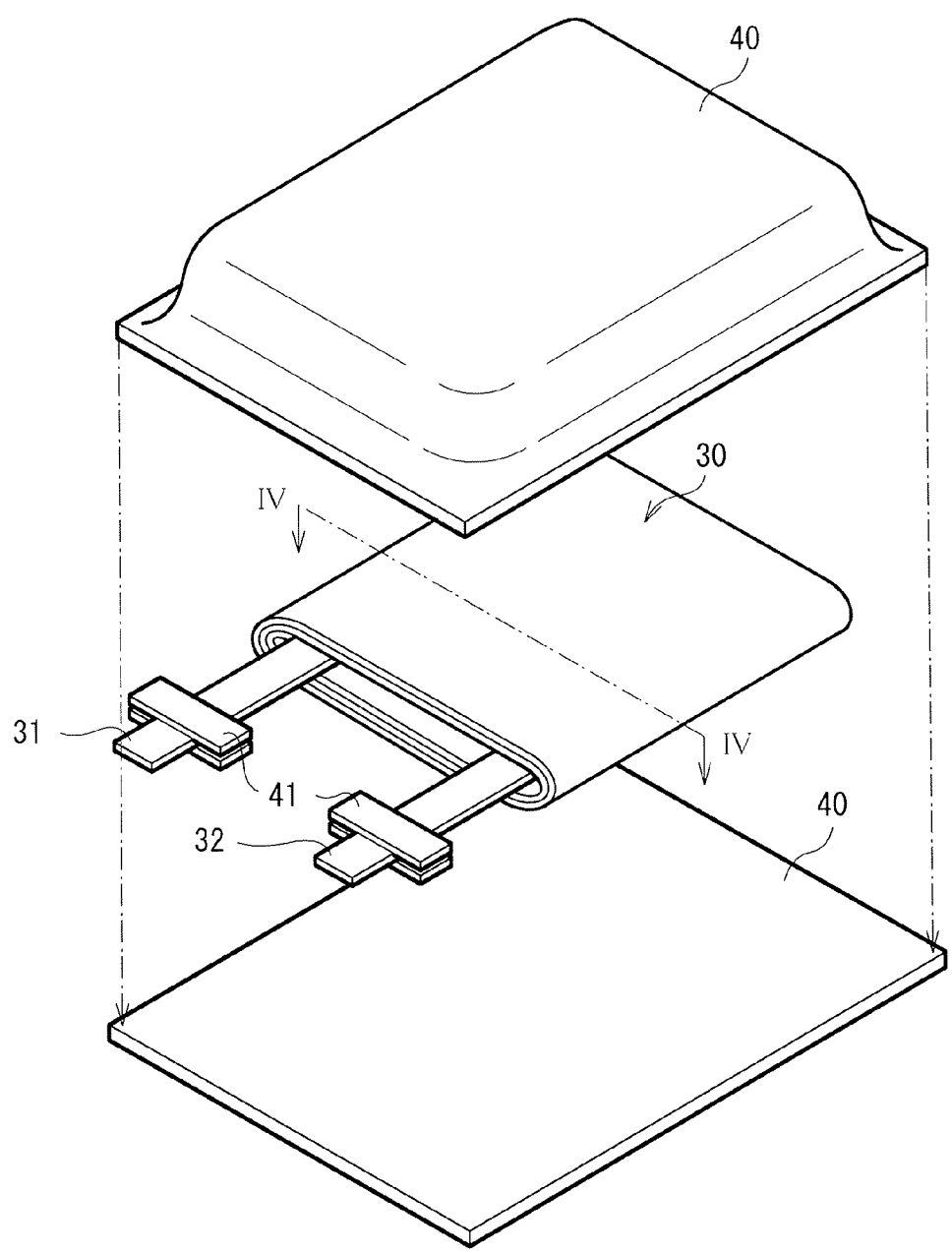
FIG. 3 is a perspective view illustrating a configuration of another secondary battery (of a laminated film type) that uses the non-aqueous electrolytic solution of an embodiment of the present application.
Figure 4:
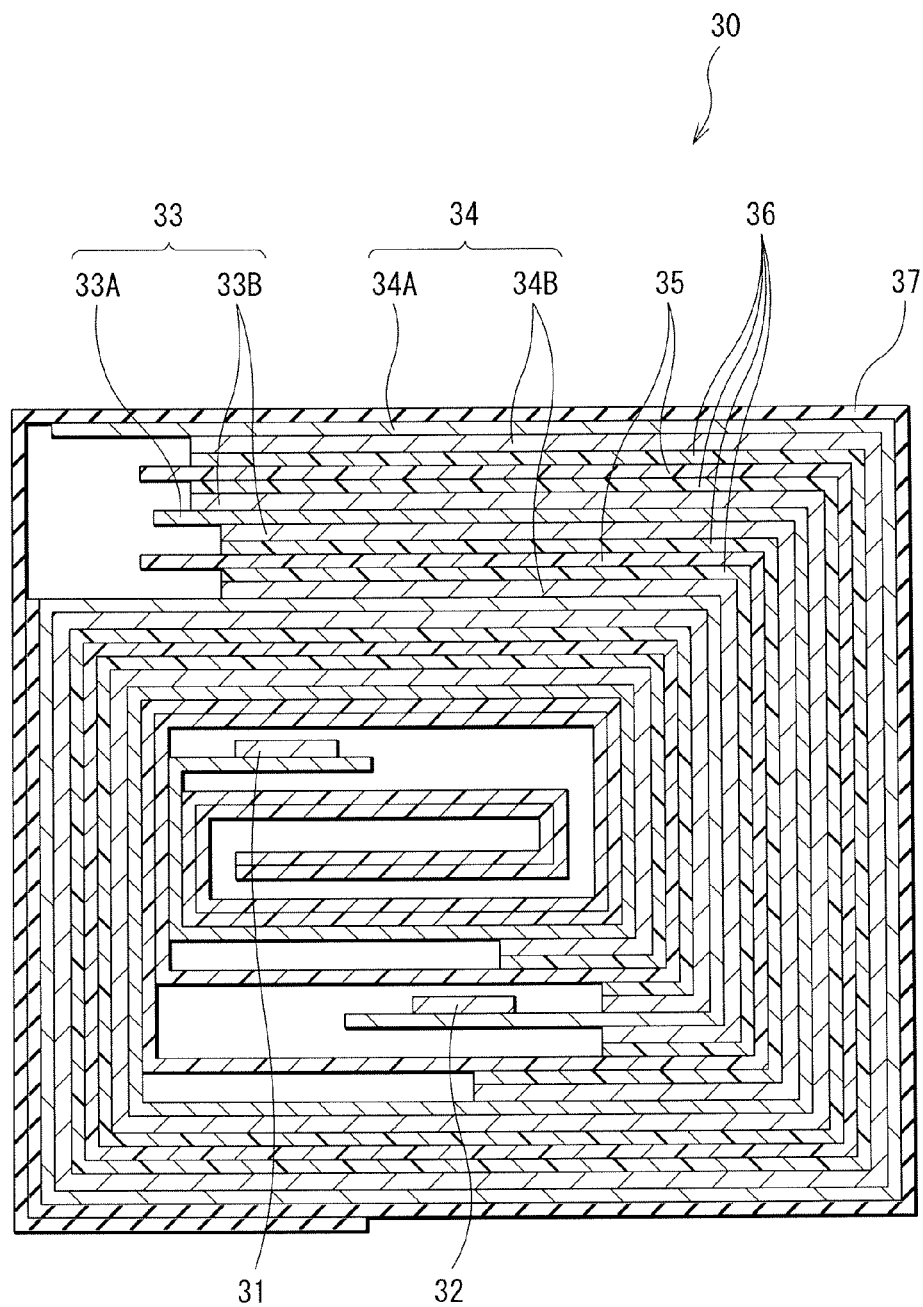
FIG. 4 is a cross-sectional view of a spirally wound electrode body taken along a line IV-IV illustrated in FIG. 3.

FIG. 3 illustrates an exploded perspective configuration of another secondary battery of an embodiment of the present application. FIG. 4 illustrates an enlarged cross-section taken along a line IV-IV of a spirally wound electrode body 30 illustrated in FIG. 3. In the following description, the elements of the cylindrical-type secondary battery described above will be used where appropriate.

[General Configuration of Secondary Battery]

The secondary battery described here is a so-called laminated-film-type lithium ion secondary battery. The secondary battery contains the spirally wound electrode body 30 in a film-like outer package member 40. In the spirally wound electrode body 30, a cathode 33 and an anode 34 are laminated with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of an electrically-conductive material such as aluminum, and the anode lead 32 may be made, for example, of an electrically-conducive material such as copper, nickel, and stainless steel. These electrically-conductive materials may be in the shape of, for example, a thin plate or mesh.

The outer package member 40 may be a laminated film in which, for example, a fusion bonding layer, a metal layer, and a surface protective layer are laminated in this order. In the laminated film, outer edges of the two film-shaped fusion bonding layers are fusion bonded so that the fusion bonding layers are opposed to the spirally wound electrode body 30. However, the two films may be bonded to each other by an adhesive, or the like. Examples of the fusion bonding layer may include a film made of one or more of polyethylene, polypropylene, and the like. Examples of the metal layer may include an aluminum foil. Examples of the surface protective layer may include a film made of one or more of nylon, polyethylene terephthalate, and the like.

In particular, the outer package member 40 may be preferably an aluminum laminated film in which a polyethylene film, an aluminum foil, and a nylon film are laminated in this order. However, the outer package member 40 may be a laminated film having other laminated structure, a polymer film such as polypropylene, or a metal film.

For example, a close-attachment film 41 to prevent outside air intrusion may be inserted between the outer package member 40 and the cathode lead 31 and between the outer package member 40 and the anode lead 32. The close-attachment film 41 is made of a material having close-attachment characteristics with respect to the cathode lead 31 and the anode lead 32. Examples of the material having close-attachment characteristics may include polyolefin resin that may include one or more of polyethylene, polypropylene, modified polyethylene, and modified polypropylene.

The cathode 33 may have, for example, a cathode active material layer 33B on one surface or both surfaces of a cathode current collector 33A. The anode 34 may have, for example, an anode active material layer 34B on one surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. The configuration of the separator 35 may be, for example, similar to the configuration of the separator 23.

The electrolyte layer 36 includes electrolytic solution and a polymer compound, and the electrolytic solution is held by the polymer compound. The electrolyte layer 36 is a so-called gel electrolyte, because thereby, high ion conductivity (for example, 1 mS/cm or more at room temperature) is obtained and liquid leakage of the electrolytic solution is prevented. The electrolyte layer 36 may further contain other material such as an additive as necessary.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, a copolymer of vinylidene fluoride and hexafluoropropyrene, and the like. In particular, polyvinylidene fluoride or the copolymer of vinylidene fluoride and hexafluoro propylene may be preferable, and polyvinylidene fluoride may be more preferable, because such a polymer compound is electrochemically stable.

For example, the configuration of the electrolytic solution may be similar to the configuration of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. In contrast, at the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, precursor solution containing electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are laminated with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the close-attachment films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are laminated with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method and/or the like, and the spirally wound body is contained in the pouch-like outer package member 40. Subsequently, electrolytic solution, monomers as a raw material for the polymer compound, a polymerization initiator, and other materials such as a polymerization inhibitor are mixed to prepare a composition for electrolyte. Subsequently, the composition for electrolyte is injected into the pouch-like outer package member 40. Thereafter, the outer package member 40 is hermetically sealed by a thermal fusion bonding method and/or the like. Subsequently, the monomers are thermally polymerized, and thereby, a polymer compound is formed. Thereby, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples thereof may include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is closely attached to the cathode 33 and the anode 34 with the polymer compound in between. Thereby, the polymer compound is impregnated with the electrolytic solution, the polymer compound is gelated, and accordingly, the electrolyte layer 36 is formed.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, the cathode 33, the anode 34, and the separator 35 are sufficiently and closely attached to the electrolyte layer 36.

[Functions and Effects of Secondary Battery]

According to the laminated-film-type secondary battery, the electrolytic solution included in the electrolyte layer 36 has a configuration similar to the configuration of the electrolytic solution of the embodiment of the present application. Accordingly, superior battery characteristics are achieved for a reason similar to that for the cylindrical-type secondary battery. Other functions and other effects are similar to those of the cylindrical-type secondary battery.

[2-3. Lithium Metal Secondary Battery (Cylindrical Type and Laminated Film Type)]

A secondary battery described here is a cylindrical-type lithium secondary battery (a lithium metal secondary battery) in which capacity of the anode 22 is represented by precipitation and dissolution of lithium metal. The secondary battery has a configuration similar to the configuration of the lithium ion secondary battery (of a cylindrical type) described above, and is manufactured by similar procedures, except that the anode active material layer 22B is formed of lithium metal.

In this secondary battery, lithium metal is used as the anode active material, which achieves high energy density. The anode active material layer 22B may be present at the time of assembling. However, the anode active material layer 22B may not be present at the time of assembling, and may be formed of lithium metal that is precipitated at the time of charge. Further, the anode active material layer 22B may be utilized as a current collector, and the anode current collector 22A may be omitted.

This secondary battery may operate as follows, for example. At the time of charge, when the lithium ion is extracted from the cathode 21, the extracted lithium ion is precipitated, through the electrolytic solution, as lithium metal on the surface of the anode current collector 22A. At the time of discharge, when lithium metal is dissolved as lithium ion from the anode active material layer 22B into the electrolytic solution, the lithium ion is inserted into the cathode 21 through the electrolytic solution.

According to this cylindrical-type lithium metal secondary battery, the electrolytic solution has a configuration similar to the configuration of the electrolytic solution of the present application. Accordingly, superior battery characteristics are achieved for a reason similar to that for the lithium ion secondary battery. Other functions and effects are similar to those of the lithium ion secondary battery.

It is to be noted that the configuration of the lithium metal secondary battery described above is not limited to a cylindrical-type secondary battery, and may be applied to a laminated-film-type secondary battery. Similar effects are achieved also in this case.

[3. Applications of Secondary Battery]

Next, description is provided of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (an electric power source used preferentially), or may be an auxiliary electric power source (an electric power source used instead of a main electric power source or used being switched from the main electric power source). In the case where the secondary battery is used as the auxiliary electric power source, the kind of the main electric power source is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a mobile lifestyle appliance such as an electric shaver; a storage device such as a backup electric power source and a memory card; an electric power tool such as an electric drill and an electric saw; a battery pack used as an attachable and detachable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, in these applications, since superior battery characteristics are demanded, performance is effectively improved with the use of the secondary battery according to the embodiment of the present application. It is to be noted that the battery pack is an electric power source using secondary batteries, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the stored electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description is specifically given of some application examples of the secondary battery. It is to be noted that the configurations of the respective application examples described below are mere examples, and may be changed as appropriate.

[3-1. Battery Pack]

Figure 5:
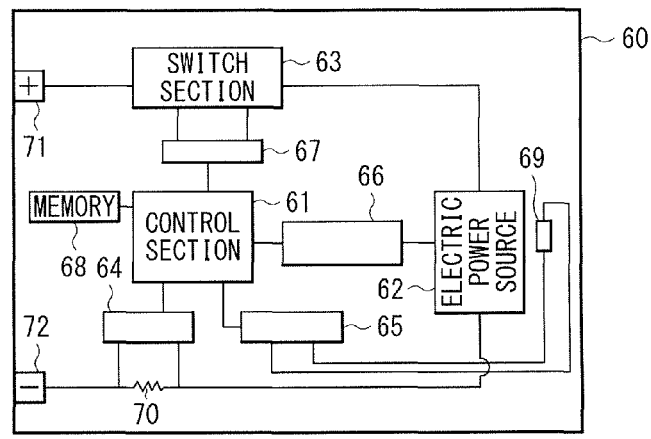
FIG. 5 is a block diagram illustrating a configuration of an application example (a battery pack) of the secondary battery.

FIG. 5 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may be made, for example, of a plastic material or the like.

The control section 61 controls operation of the whole battery pack (including a used state of the electric power source 62), and may include, for example, a central processing unit (CPU) and/or the like. The electric power source 62 includes one or more secondary batteries of an embodiment of the present application. The electric power source 62 may be, for example, an assembled battery including two or more secondary batteries. Connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge at the time of abnormal heat generation or a case in which the control section 61 performs a correction process at the time of calculating remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charge current is prevented from flowing in a current path of the electric power source 62 by disconnecting the switch section 63 (a charge control switch) in the case where, for example, the battery voltage reaches an overcharge detection voltage. Accordingly, in the electric power source 62, only discharge is allowed to be performed through the discharging diode. It is to be noted that, for example, in the case where a large current flows at the time of charge, the switch control section 67 blocks the charge current.

Further, the switch control section 67 causes a discharge current to be prevented from flowing in the current path of the electric power source 62 by disconnecting the switch section 63 (a discharge control switch) in the case where, for example, the battery voltage reaches an overdischarge detection voltage. Accordingly, in the electric power source 62, only charge is allowed to be performed through the charging diode. It is to be noted that, for example, in the case where a large current flows at the time of discharge, the switch control section 67 blocks the discharge current.

It is to be noted that, in the secondary battery, for example, the overcharge detection voltage may be about 4.20 V±0.05 V, and the overdischarge detection voltage may be about 2.4 V±0.1 V.

The memory 68 may be, for example, an EEPROM as a non-volatile memory, or the like. The memory 68 may store, for example, numerical values calculated by the control section 61 and information of the secondary battery measured in a manufacturing step (such as an internal resistance in the initial state). It is to be noted that, in the case where the memory 68 stores full charge capacity of the secondary battery, the control section 61 is allowed to comprehend information such as remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack or an external device (such as a battery charger) used for charging the battery pack. The electric power source 62 is charged and discharged through the cathode terminal 71 and the anode terminal 72.

[3-2. Electric Vehicle]

Figure 6:
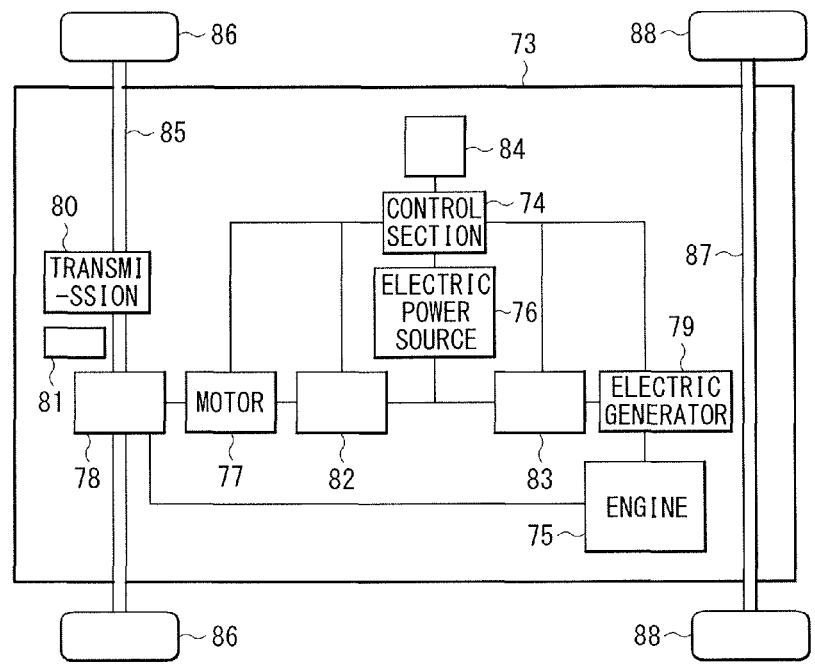
FIG. 6 is a block diagram illustrating a configuration of an application example (an electric vehicle) of the secondary battery.

FIG. 6 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. With the use of the torque, the electric generator 79 generates alternating-current electric power. The generated alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by utilizing the torque. It may be preferable that the alternating-current electric power is converted into direct-current electric power through the inverter 82, and the direct-current regenerative electric power is stored in the electric power source 76.

The control section 74 controls operations of the whole electric vehicle, and, for example, may include a CPU and/or the like. The electric power source 76 includes one or more secondary batteries of an embodiment of the present application. Alternatively, the electric power source 76 may be connected to an external electric power source, and electric power may be stored by receiving the electric power from the external electric power source. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (an electric automobile) that operates with the use of only the electric power source 76 and the motor 77 without using the engine 75.

[3-3. Electric Power Storage System]

Figure 7:
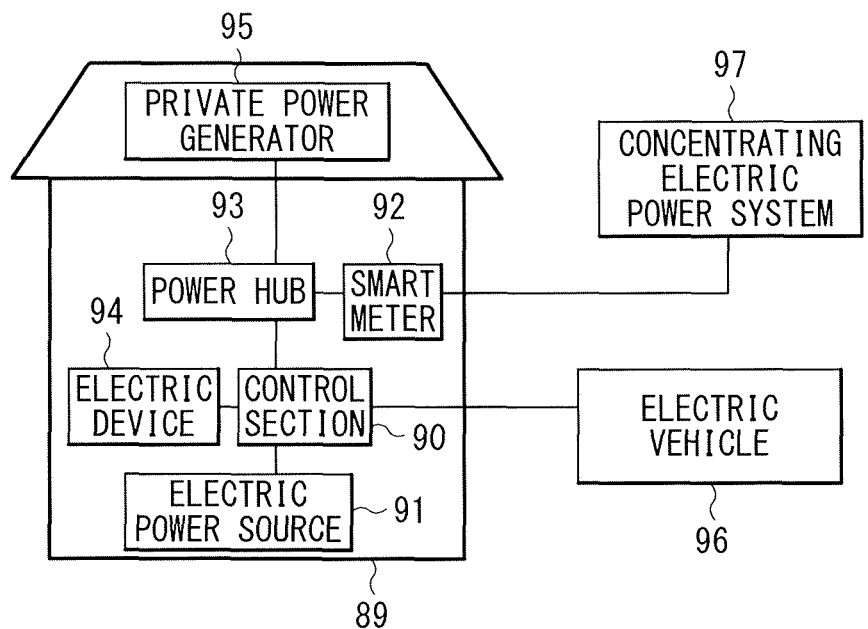
FIG. 7 is a block diagram illustrating a configuration of an application example (an electric power storage system) of the secondary battery.

FIG. 7 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connectable to an electric vehicle 96 parked outside the house 89. Further, for example, the electric power source 91 may be connected to a private power generator 95 arranged in the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries of an embodiment of the present application. The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89, and thereby allows effective and stable energy supply.

In the electric power storage system, for example, electric power may be stored in the electric power source 91 from the concentrating electric power system 97 as an external electric power source through the smart meter 92 and the power hub 93, and electric power is stored in the electric power source 91 from the private power generator 95 as an independent electric power source through the power hub 93. The electric power stored in the electric power source 91 is supplied to the electric device 94 and the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be provided for each household (family unit), or may be provided for a plurality of households (family units).

[3-4. Electric Power Tool]

Figure 8:
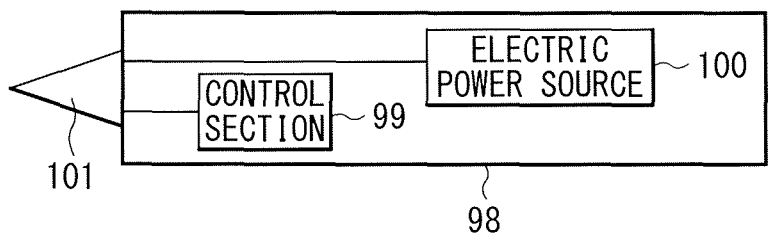
FIG. 8 is a block diagram illustrating a configuration of an application example (an electric power tool) of the secondary battery.

FIG. 8 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries of an embodiment of the present application. The control section 99 allows electric power to be supplied from the electric power source 100 to the drill section 101 according to operation of an unillustrated operation switch.

EXAMPLES

Specific examples of the embodiment of the present application are described in detail.

Examples 1-1 to 1-51

The laminated-film-type lithium ion secondary batteries illustrated in FIGS. 3 and 4 were fabricated by the following procedures.

When fabricating the cathode 33, first, 91 parts by mass of a cathode active material ($LiCoO_2$), 3 parts by mass of a cathode binder (polyvinylidene fluoride), and 6 parts by mass of a cathode electric conductor (graphite) were mixed to obtain a cathode mixture. When obtaining the cathode active material ($LiCoO_2$), lithium carbonate ($Li_2CO_3$) and cobalt carbonate ($CoCO_3$) were mixed to achieve a mole ratio of $Li_2CO_3:CoCO_3=0.5:1$, and the mixture was fired (at 900 deg C. for 5 hours) in the atmosphere. Subsequently, the cathode mixture was dispersed in an organic solvent (N-methyl-2-pyrrolidone) to obtain cathode mixture slurry. Subsequently, the cathode mixture slurry was uniformly applied onto both surfaces of the strip-like cathode current collector 33A (an aluminum foil being 12 μm thick), and the applied cathode mixture slurry was dried to form the cathode active material layer 33B. Lastly, the cathode active material layer 33B was compression-molded with the use of a roll pressing machine.

When fabricating the anode 34, first, 97 parts by mass of an anode active material (graphite which is the carbon material), 1.5 parts by mass of an anode binder (modified acrylic acid of copolymer of styrene and butadiene), and 1.5 parts by mass of a thickener (carboxymethylcellulose) were mixed to obtain an anode mixture. An average particle size (a median size D50) of the graphite (graphite powder) used as the anode active material was 20 μm. Subsequently, the anode mixture was dispersed in water to obtain anode mixture slurry. Subsequently, the anode mixture slurry was uniformly applied onto both surfaces of the strip-like anode current collector 34A (a copper foil being 15 μm thick), and the applied anode mixture slurry was dried to form the anode active material layer 34B. Lastly, the anode active material layer 34B was compression-molded with the use of a roll pressing machine.

When preparing the electrolytic solution that is a liquid electrolyte, electrolyte salt ($LiPF_6$) was dissolved in a mixture solvent (ethylene carbonate and ethyl methyl carbonate) to prepare mixture solution. In this case, a composition of the mixture solvent was set as ethylene carbonate: ethyl methyl carbonate=35:65 in weight ratio, and a content of the electrolyte salt with respect to the mixture solvent was set as 1.2 mol/dm$^3$ (=1 mol/l). Subsequently, the cyclic ether compound was added to the mixture solvent, and the resultant mixture solvent was stirred. The kinds and contents (wt %) of the cyclic ether compound were as shown in Tables 1 and 2. It is to be noted that, for comparison, electrolytic solution that included no cyclic ether compound was prepared, and electrolytic solution that included other compound instead of the cyclic ether compound was also prepared as shown in Tables 1 and 2.

When assembling the secondary battery, the cathode lead 31 made of aluminum was welded to the cathode current collector 33A of the cathode 33, and the anode lead 32 made of copper was welded to the anode current collector 34A of the anode 34. Subsequently, the cathode 33 and the anode 34 were laminated with the separator 35 (polyethylene film being 20 μm thick) in between and were spirally wound in a longitudinal direction to fabricate the spirally wound electrode body 30, and the protective tape 37 was attached to the outermost periphery thereof. Subsequently, after the spirally wound electrode body 30 was sandwiched between two pieces of film-like outer package members 40, the outermost peripheries of three sides of the outer package members 40 were bonded by a thermal fusion bonding method, and the outer package members 40 were made into a pouch-like shape. The outer package members 40 were each a moisture-resistant aluminum laminated film in which a nylon film being 25 μm thick, an aluminum foil being 40 μm thick, and a polypropylene film being 30 μm thick were laminated in order from the outer side. Lastly, the electrolytic solution was injected inside the outer package members 40, and the separator 35 was impregnated with the injected electrolytic solution. Thereafter, last one side of the outer package members 40 were bonded by a thermal fusion bonding method under a reduced pressure environment. In this case, the close-attachment films 41 (an acid modified propylene film being 50 μm thick) were inserted between the cathode lead 31 and the outer package member 40 and between the anode lead 32 and the outer package member 40.

It is to be noted that, when fabricating the secondary battery, an amount of the cathode active material and an amount of the anode active material were adjusted so that an open-circuit voltage at the time when the secondary battery was fully charged was equal to a charge voltage (an upper-limit voltage) shown in Tables 1 and 2.

Low-temperature cycle characteristics and high-temperature swollenness characteristics were examined as battery characteristics of the secondary batteries, and results shown in Tables 1 and 2 were obtained.

When examining the low-temperature cycle characteristics, first, in order to stabilize the battery state, the secondary battery was charged and discharged for 1 cycle under an ambient temperature environment (23 deg C.). Subsequently, the secondary battery was charged and discharged under the ambient temperature environment, and discharge capacity at the 2nd cycle was measured. Subsequently, the secondary battery that had been charged under the ambient temperature environment was conserved for three hours under a low temperature environment (−5 deg C.), and thereafter, the secondary battery was discharged under the low temperature environment. Lastly, the secondary battery was charged and discharged repeatedly until the total cycle number reached 50 cycles under the low temperature environment, and discharge capacity at the 50th cycle was measured. Based on this result, capacity retention rate (%)=(discharge capacity at the 50th cycle/discharge capacity at the 2nd cycle)×100 was calculated. At the time of charge, the secondary battery was charged at current density of 1 mA/cm$^2$ until the battery voltage reached the upper-limit voltage (see Tables 1 and 2), and thereafter, the secondary battery was further charged at the upper-limit voltage until the current density reached 0.02 mA/cm$^2$. At the time of discharge, the secondary battery was discharged at current density of 1 mA/cm$^2$ until the battery voltage reached a final voltage (3 V).

When examining the high-temperature swollenness characteristics, first, in order to stabilize the battery state, the secondary battery was charged and discharged for 2 cycles under the ambient temperature environment (23 deg C.). Subsequently, the secondary battery was charged, and the thickness of the secondary battery was measured. Subsequently, the secondary battery in the charged state was conserved under a high temperature environment (70 deg C.) for two hundred hours, and thereafter, the thickness of the secondary battery was measured. Based on this result, swollenness rate (%)=(thickness after conservation/thickness before conservation)×100 was calculated. The charge and discharge conditions were similar to those in the case of examining the low-temperature cycle characteristics.

TABLE 1

Battery structure: Laminated film type (Electrolytic solution),
Cathode active material: LiCoO$_2$, Anode active material: Graphite
Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 1-1 | Formula (10-1) | 0.01 | — | — | 56 | 148 |
| 1-2 |  | 0.1 |  |  | 59 | 145 |
| 1-3 |  | 1 |  |  | 58 | 140 |
| 1-4 |  | 3 |  |  | 52 | 140 |
| 1-5 | Formula (10-2) | 0.01 |  |  | 60 | 137 |
| 1-6 |  | 0.1 |  |  | 67 | 129 |
| 1-7 |  | 1 |  |  | 66 | 128 |
| 1-8 |  | 3 |  |  | 56 | 128 |
| 1-9 | Formula (10-3) | 0.01 |  |  | 62 | 133 |
| 1-10 |  | 0.1 |  |  | 70 | 123 |
| 1-11 |  | 1 |  |  | 70 | 119 |
| 1-12 |  | 3 |  |  | 59 | 118 |
| 1-13 | Formula (10-12) | 0.01 |  |  | 59 | 139 |
| 1-14 |  | 0.1 |  |  | 65 | 129 |
| 1-15 |  | 1 |  |  | 63 | 128 |
| 1-16 |  | 3 |  |  | 55 | 127 |
| 1-17 | Formula (11-1) | 0.01 |  |  | 55 | 153 |
| 1-18 |  | 0.1 |  |  | 58 | 151 |
| 1-19 |  | 1 |  |  | 58 | 146 |
| 1-20 |  | 3 |  |  | 52 | 145 |
| 1-21 | Formula (11-2) | 0.01 |  |  | 59 | 138 |
| 1-22 |  | 0.1 |  |  | 63 | 130 |
| 1-23 |  | 1 |  |  | 62 | 130 |
| 1-24 |  | 3 |  |  | 55 | 129 |

TABLE 2

Battery structure: Laminated film type (Electrolytic solution),
Cathode active material: LiCoO$_2$, Anode active material: Graphite
Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 1-25 | Formula (11-3) | 0.01 | — | — | 58 | 139 |
| 1-26 |  | 0.1 |  |  | 63 | 130 |
| 1-27 |  | 1 |  |  | 63 | 129 |
| 1-28 |  | 3 |  |  | 54 | 129 |
| 1-29 | Formula (11-4) | 0.01 |  |  | 58 | 140 |
| 1-30 |  | 0.1 |  |  | 64 | 130 |
| 1-31 |  | 1 |  |  | 63 | 129 |
| 1-32 |  | 3 |  |  | 55 | 128 |
| 1-33 | Formula (11-5) | 0.01 |  |  | 55 | 153 |
| 1-34 |  | 0.1 |  |  | 58 | 150 |
| 1-35 |  | 1 |  |  | 57 | 146 |
| 1-36 |  | 3 |  |  | 53 | 146 |
| 1-37 | Formula (12-1) | 0.01 |  |  | 58 | 149 |
| 1-38 |  | 0.1 |  |  | 62 | 144 |
| 1-39 |  | 1 |  |  | 62 | 140 |
| 1-40 |  | 3 |  |  | 54 | 139 |
| 1-41 | Formula (12-2) | 0.01 |  |  | 60 | 140 |
| 1-42 |  | 0.1 |  |  | 67 | 130 |
| 1-43 |  | 1 |  |  | 66 | 129 |
| 1-44 |  | 3 |  |  | 56 | 129 |
| 1-45 | — | — | — | — | 50 | 179 |
| 1-46 | — | — | Formula (24-1) | 1 | 50 | 166 |
| 1-47 |  |  | Formula (24-2) |  | 48 | 175 |
| 1-48 |  |  | Formula (24-3) |  | 46 | 170 |
| 1-49 |  |  | Formula (24-4) |  | 38 | 171 |
| 1-50 |  |  | Formula (24-5) |  | 32 | 155 |

TABLE 2-continued

Battery structure: Laminated film type (Electrolytic solution),
Cathode active material: LiCoO$_2$, Anode active material: Graphite
Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 1-51 | | | Formula (24-6) | | 33 | 165 |

In the case where the cyclic ether compound was used (Examples 1-1 to 1-44), the capacity retention rate was largely increased, and the swollenness rate was largely decreased, compared to the case where the cyclic ether compound was not used (Example 1-45). It is to be noted that, in the case where other compound was used (Examples 1-46 to 1-51), the swollenness rate was decreased, but the capacity retention rate was equivalent or was largely decreased, compared to the case where other compound was not used (Example 1-45).

In particular, the following tendencies were achieved in the case where the cyclic ether compound was used. First, when the content of the cyclic ether compound was from 0.01 wt % to 3 wt %, high capacity retention rate was achieved, and the swollenness rate was sufficiently suppressed. Secondly, in the case where the number of the substituent group (—X—O—R) represented by Formula (1) was two or larger, when the number of group that has carbon-carbon multiple bond bonded to an ether bond was two or larger (for example, Examples 1-9 to 1-12), the capacity retention rate was further increased, and the swollenness rate was further decreased, compared to the case where the number of group that has carbon-carbon multiple bond bonded to an ether bond was one (for example, Examples 1-1 to 1-4).

Examples 2-1 to 2-51

As shown in Tables 3 and 4, secondary batteries were fabricated by procedures similar to those of Examples 1-1 to 1-51 except for chaining the upper-limit voltage, and the battery characteristics were examined.

TABLE 3

Battery structure: Laminated film type (Electrolytic solution),
Cathode active material: LiCoO2, Anode active material: Graphite
Upper-limit voltage: 4.45 V

| Example | Cyclic ether compound Kind | Content (wt %) | Other compound Kind | Content (wt %) | Capacity retention rate (%) | Swollenness rate (%) |
|---|---|---|---|---|---|---|
| 2-1 | Formula (10-1) | 0.01 | — | — | 42 | 178 |
| 2-2 | | 0.1 | | | 47 | 168 |
| 2-3 | | 1 | | | 46 | 166 |
| 2-4 | | 3 | | | 41 | 165 |
| 2-5 | Formula (10-2) | 0.01 | | | 50 | 171 |
| 2-6 | | 0.1 | | | 57 | 163 |
| 2-7 | | 1 | | | 55 | 159 |
| 2-8 | | 3 | | | 46 | 159 |
| 2-9 | Formula (10-3) | 0.01 | | | 52 | 165 |
| 2-10 | | 0.1 | | | 62 | 157 |
| 2-11 | | 1 | | | 61 | 155 |
| 2-12 | | 3 | | | 47 | 154 |
| 2-13 | Formula | 0.01 | | | 47 | 173 |
| 2-14 | (10-12) | 0.1 | | | 51 | 164 |
| 2-15 | | 1 | | | 50 | 161 |
| 2-16 | | 3 | | | 43 | 160 |
| 2-17 | Formula (11-1) | 0.01 | | | 41 | 183 |
| 2-18 | | 0.1 | | | 46 | 175 |
| 2-19 | | 1 | | | 46 | 172 |
| 2-20 | | 3 | | | 40 | 170 |
| 2-21 | Formula (11-2) | 0.01 | | | 46 | 172 |
| 2-22 | | 0.1 | | | 51 | 163 |
| 2-23 | | 1 | | | 50 | 162 |
| 2-24 | | 3 | | | 43 | 161 |

TABLE 4

Battery structure: Laminated film type (Electrolytic solution),
Cathode active material: LiCoO$_2$, Anode active material: Graphite
Upper-limit voltage: 4.45 V

| Example | Cyclic ether compound Kind | Content (wt %) | Other compound Kind | Content (wt %) | Capacity retention rate (%) | Swollenness rate (%) |
|---|---|---|---|---|---|---|
| 2-25 | Formula (11-3) | 0.01 | — | — | 47 | 173 |
| 2-26 | | 0.1 | | | 51 | 162 |
| 2-27 | | 1 | | | 51 | 161 |
| 2-28 | | 3 | | | 43 | 160 |
| 2-29 | Formula (11-4) | 0.01 | | | 46 | 173 |
| 2-30 | | 0.1 | | | 51 | 165 |
| 2-31 | | 1 | | | 50 | 162 |
| 2-32 | | 3 | | | 42 | 161 |
| 2-33 | Formula (11-5) | 0.01 | | | 42 | 184 |
| 2-34 | | 0.1 | | | 46 | 174 |
| 2-35 | | 1 | | | 45 | 171 |
| 2-36 | | 3 | | | 40 | 171 |
| 2-37 | Formula (12-1) | 0.01 | | | 45 | 176 |
| 2-38 | | 0.1 | | | 50 | 168 |
| 2-39 | | 1 | | | 50 | 167 |
| 2-40 | | 3 | | | 43 | 166 |
| 2-41 | Formula (12-2) | 0.01 | | | 50 | 172 |
| 2-42 | | 0.1 | | | 55 | 163 |
| 2-43 | | 1 | | | 54 | 160 |
| 2-44 | | 3 | | | 45 | 159 |
| 2-45 | — | — | — | — | 38 | 216 |
| 2-46 | — | — | Formula (24-1) | 1 | 38 | 198 |
| 2-47 | | | Formula (24-2) | | 35 | 213 |
| 2-48 | | | Formula (24-3) | | 34 | 205 |
| 2-49 | | | Formula (24-4) | | 30 | 208 |
| 2-50 | | | Formula (24-5) | | 20 | 190 |
| 2-51 | | | Formula (24-6) | | 23 | 195 |

Also when the upper-limit voltage was increased (Tables 3 and 4), results similar to those in the case where the upper-limit voltage was decreased (Tables 1 and 2) were obtained. Specifically, in the case where the cyclic ether compound was used (Examples 2-1 to 2-44), the capacity retention rate was largely increased, and the swollenness rate was largely decreased, compared to the case where the cyclic ether compound was not used (Examples 2-45 to 2-51). Description of other tendencies is omitted here.

Examples 3-1 to 3-51

As shown in Tables 5 and 6, secondary batteries were fabricated by procedures similar to those of Examples 1-1 to 1-51 except for using the electrolyte layer 36 which was a gel electrolyte instead of the electrolytic solution which is a liquid electrolyte, and the battery characteristics were examined.

When forming the electrolyte layer 36, first, electrolyte salt (LiPF$_6$) was dissolved into a mixture solvent (ethylene carbonate and propylene carbonate) to prepare sol mixture solution. In this case, a composition of the mixture solvent was set as ethylene carbonate:propylene carbonate=50:50 in weight ratio, and the content of the electrolyte salt was set as 1 mol/kg with respect to the mixture solvent. Subsequently, as shown in Tables 5 and 6, the cyclic ether compound or other compound was added to the mixture solution as necessary. Subsequently, 30 parts by mass of the electrolytic solution, 10 parts by mass of a polymer compound (a copolymer of vinylidene fluoride and hexafluoropropylene), and 60 parts by mass of an organic solvent (dimethyl carbonate) were mixed to prepare a precursor solution. A copolymerization amount of hexafluoropropylene in the copolymer was 6.9 wt %. Lastly, the precursor solution was applied on a front surface and a rear surface of each of the cathode 33 and the anode 34, and thereafter, the applied precursor solution was dried. Thus, the gel electrolyte layer 36 was formed.

TABLE 5

Battery structure: Laminated film type (Electrolyte layer),
Cathode active material: LiCoO$_2$, Anode active material: Graphite
Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 3-1 | Formula | 0.01 | — | — | 43 | 126 |
| 3-2 | (10-1) | 0.1 | | | 48 | 120 |
| 3-3 | | 1 | | | 47 | 118 |
| 3-4 | | 3 | | | 40 | 118 |
| 3-5 | Formula | 0.01 | | | 49 | 119 |
| 3-6 | (10-2) | 0.1 | | | 59 | 115 |
| 3-7 | | 1 | | | 59 | 112 |
| 3-8 | | 3 | | | 46 | 112 |
| 3-9 | Formula | 0.01 | | | 51 | 113 |
| 3-10 | (10-3) | 0.1 | | | 62 | 109 |
| 3-11 | | 1 | | | 62 | 107 |
| 3-12 | | 3 | | | 48 | 106 |
| 3-13 | Formula | 0.01 | | | 46 | 120 |
| 3-14 | (10-12) | 0.1 | | | 56 | 115 |
| 3-15 | | 1 | | | 54 | 114 |
| 3-16 | | 3 | | | 44 | 112 |
| 3-17 | Formula | 0.01 | | | 42 | 131 |
| 3-18 | (11-1) | 0.1 | | | 46 | 126 |
| 3-19 | | 1 | | | 46 | 124 |
| 3-20 | | 3 | | | 40 | 123 |
| 3-21 | Formula | 0.01 | | | 46 | 121 |
| 3-22 | (11-2) | 0.1 | | | 54 | 116 |
| 3-23 | | 1 | | | 53 | 113 |
| 3-24 | | 3 | | | 44 | 112 |

TABLE 6

Battery structure: Laminated film type (Electrolyte layer),
Cathode active material: LiCoO$_2$, Anode active material: Graphite
Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 3-25 | Formula | 0.01 | — | — | 46 | 122 |
| 3-26 | (11-3) | 0.1 | | | 54 | 117 |
| 3-27 | | 1 | | | 54 | 113 |
| 3-28 | | 3 | | | 43 | 113 |
| 3-29 | Formula | 0.01 | | | 45 | 122 |
| 3-30 | (11-4) | 0.1 | | | 54 | 116 |
| 3-31 | | 1 | | | 53 | 116 |
| 3-32 | | 3 | | | 43 | 112 |
| 3-33 | Formula | 0.01 | | | 41 | 132 |
| 3-34 | (11-5) | 0.1 | | | 47 | 126 |
| 3-35 | | 1 | | | 46 | 124 |
| 3-36 | | 3 | | | 40 | 124 |
| 3-37 | Formula | 0.01 | | | 44 | 126 |
| 3-38 | (12-1) | 0.1 | | | 50 | 120 |
| 3-39 | | 1 | | | 50 | 119 |
| 3-40 | | 3 | | | 42 | 118 |
| 3-41 | Formula | 0.01 | | | 48 | 120 |
| 3-42 | (12-2) | 0.1 | | | 58 | 115 |
| 3-43 | | 1 | | | 57 | 113 |
| 3-44 | | 3 | | | 45 | 112 |
| 3-45 | — | — | — | — | 36 | 150 |
| 3-46 | — | — | Formula (24-1) | 1 | 36 | 139 |
| 3-47 | | | Formula (24-2) | | 33 | 146 |
| 3-48 | | | Formula (24-3) | | 33 | 145 |
| 3-49 | | | Formula (24-4) | | 25 | 144 |
| 3-50 | | | Formula (24-5) | | 19 | 134 |
| 3-51 | | | Formula (24-6) | | 22 | 138 |

Also when the gel electrolyte (the electrolyte layer 36) was used (Tables 5 and 6), results similar to those in the case where the liquid electrolyte (the electrolytic solution) was used (Tables 1 and 2) were obtained. Specifically, in the case where the cyclic ether compound was used (Examples 3-1 to 3-44), the capacity retention rate was largely increased, and the swollenness rate was largely decreased, compared to the case where the cyclic ether compound was not used (Examples 3-45 to 3-51). Description of other tendencies is omitted here.

Examples 4-1 to 4-51

As shown in Tables 7 and 8, secondary batteries were fabricated by procedures similar to those of Examples 1-1 to 1-51 except for using the metal-based material (silicon: Si) instead of the carbon material (graphite) as the anode active material, and the battery characteristics were examined.

When forming the anode active material layer 34B, first, 90 parts by mass of the anode active material (silicon which was the metal-based material), 5 parts by mass of a binder material (polyamic acid which was a precursor of polyimide), and 5 parts by mass of the anode electric conductor (graphite) were mixed to prepare an anode mixture. An average size (a median size D50) of silicon (silicon powder) used as the anode active material was 5 μm. Subsequently, the anode mixture was dispersed into the organic solvent (N-methyl-2-pyrrolidone) to obtain anode mixture slurry. Subsequently, the anode mixture slurry was uniformly applied onto both surfaces of the strip-like anode current collector 34A (a copper foil being 15 μm thick), and the applied anode mixture slurry was dried to form the mixture layer. Subsequently, the mixture layer was compression-molded with the use of a roll pressing machine. Lastly, the mixture layer was heated (at 400 deg C. for twelve hours) under vacuum atmosphere. Thus, the anode binder (polyimide) was formed, and the anode active material layer 34B was therefore formed.

TABLE 7

Battery structure: Laminated film type (Electrolytic solution), Cathode active material: $LiCoO_2$, Anode active material: Si Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 4-1  | Formula (10-1)  | 0.01 | — | — | 50 | 199 |
| 4-2  |                 | 0.1  |   |   | 53 | 190 |
| 4-3  |                 | 1    |   |   | 52 | 187 |
| 4-4  |                 | 3    |   |   | 47 | 186 |
| 4-5  | Formula (10-2)  | 0.01 |   |   | 56 | 190 |
| 4-6  |                 | 0.1  |   |   | 62 | 178 |
| 4-7  |                 | 1    |   |   | 60 | 176 |
| 4-8  |                 | 3    |   |   | 52 | 175 |
| 4-9  | Formula (10-3)  | 0.01 |   |   | 58 | 185 |
| 4-10 |                 | 0.1  |   |   | 66 | 174 |
| 4-11 |                 | 1    |   |   | 64 | 172 |
| 4-12 |                 | 3    |   |   | 53 | 171 |
| 4-13 | Formula (10-12) | 0.01 |   |   | 54 | 192 |
| 4-14 |                 | 0.1  |   |   | 59 | 182 |
| 4-15 |                 | 1    |   |   | 57 | 182 |
| 4-16 |                 | 3    |   |   | 49 | 180 |
| 4-17 | Formula (11-1)  | 0.01 |   |   | 49 | 203 |
| 4-18 |                 | 0.1  |   |   | 52 | 195 |
| 4-19 |                 | 1    |   |   | 51 | 194 |
| 4-20 |                 | 3    |   |   | 47 | 192 |
| 4-21 | Formula (11-2)  | 0.01 |   |   | 52 | 194 |
| 4-22 |                 | 0.1  |   |   | 56 | 186 |
| 4-23 |                 | 1    |   |   | 56 | 183 |
| 4-24 |                 | 3    |   |   | 49 | 181 |

TABLE 8

Battery structure: Laminated film type (Electrolytic solution), Cathode active material: $LiCoO_2$, Anode active material: Si Upper-limit voltage: 4.35 V

| Example | Cyclic ether compound Kind | Content (wt %) | Other compound Kind | Content (wt %) | Capacity retention rate (%) | Swollenness rate (%) |
|---|---|---|---|---|---|---|
| 4-25 | Formula (11-3)  | 0.01 | — | — | 51 | 194 |
| 4-26 |                 | 0.1  |   |   | 56 | 185 |
| 4-27 |                 | 1    |   |   | 55 | 182 |
| 4-28 |                 | 3    |   |   | 49 | 180 |
| 4-29 | Formula (11-4)  | 0.01 |   |   | 51 | 193 |
| 4-30 |                 | 0.1  |   |   | 57 | 184 |
| 4-31 |                 | 1    |   |   | 56 | 183 |
| 4-32 |                 | 3    |   |   | 48 | 181 |
| 4-33 | Formula (11-5)  | 0.01 |   |   | 49 | 203 |
| 4-34 |                 | 0.1  |   |   | 52 | 196 |
| 4-35 |                 | 1    |   |   | 52 | 194 |
| 4-36 |                 | 3    |   |   | 47 | 193 |
| 4-37 | Formula (12-1)  | 0.01 |   |   | 52 | 199 |
| 4-38 |                 | 0.1  |   |   | 56 | 190 |
| 4-39 |                 | 1    |   |   | 54 | 188 |
| 4-40 |                 | 3    |   |   | 49 | 186 |
| 4-41 | Formula (12-2)  | 0.01 |   |   | 55 | 193 |
| 4-42 |                 | 0.1  |   |   | 60 | 182 |
| 4-43 |                 | 1    |   |   | 59 | 180 |
| 4-44 |                 | 3    |   |   | 51 | 179 |
| 4-45 | —               | —    | — | — | 45 | 226 |
| 4-46 | —               | —    | Formula (24-1) | 1 | 43 | 210 |
| 4-47 |                 |      | Formula (24-2) |   | 40 | 223 |
| 4-48 |                 |      | Formula (24-3) |   | 40 | 216 |
| 4-49 |                 |      | Formula (24-4) |   | 35 | 219 |
| 4-50 |                 |      | Formula (24-5) |   | 30 | 205 |
| 4-51 |                 |      | Formula (24-6) |   | 32 | 209 |

Also when the metal-based material was used as the anode active material (Tables 7 and 8), results similar to those in the case where the carbon material was used (Tables 1 and 2) were obtained. Specifically, in the case where the cyclic ether compound was used (Examples 4-1 to 4-44), the capacity retention rate was largely increased, and the swollenness rate was largely decreased, compared to the case where the cyclic ether compound was not used (Examples 4-45 to 4-51). Description of other tendencies is omitted here.

Examples 5-1 to 5-51 and 6-1 to 6-51

As shown in Tables 9 to 12, secondary batteries were fabricated by procedures similar to those of Examples 1-1 to 1-51 except for changing the kind of the cathode active material and changing the upper-limit voltage, and the battery characteristics were examined.

When obtaining the cathode active material ($Li_{1.13}(Mn_{0.60}Ni_{0.20}Co_{0.20})_{0.86}Al_{0.01}O_2$, first, nickel sulfate ($NiSO_4$), cobalt sulfate ($CoSO_4$), manganese sulfate ($MnSO_4$), and sodium aluminate ($NaAlO_2$) were mixed. In this case, a mixture ratio (a mole ratio) of main elements was set as Mn:Ni:Co=60:20:20, and Al: (Mn+Ni+Co)=1:86. Subsequently, the mixture was dispersed into water to prepare aqueous solution. Subsequently, sodium hydroxide (NaOH) was added to the aqueous solution while the aqueous solution was sufficiently stirred to obtain a coprecipitate (manganese-nickel-cobalt-aluminum composite coprecipitate hydroxide). Subsequently, the coprecipitate was washed with water, and the washed coprecipitate was dried. Thereafter, lithium hydroxide monohydrate salt was added to the dried coprecipitate to obtain a precursor. In this case, the mixture ratio (the mole ratio) of the main elements was set as Li: (Mn+Ni+Co+Al)=113:87. Lastly, the precursor was fired in the atmosphere (at 800 deg C. for ten hours).

When obtaining the cathode active material ($LiNi_{0.50}Mn_{1.50}O_4$), first, lithium carbonate ($Li_2CO_3$), manganese oxide ($MnO_2$), and nickel oxide (NiO) were weighed, and thereafter, the weighed materials were mixed with the use of a ball mill. In this case, a mixture ratio (a mole ratio) of the main elements was set as Ni:Mn=25:75. Subsequently, the mixture was fired in the atmosphere (at 800 deg C. for ten hours), and the fired mixture was cooled down. Lastly, the fired materials were mixed again with the use of the ball mill, and the mixed fired materials were fired again in the atmosphere (at 700 deg C. for ten hours).

TABLE 9

Battery structure: Laminated film type (Electrolytic solution)
Cathode active material: $Li_{1.13}(Mn_{0.60}Ni_{0.20}Co_{0.20})_{0.86}Al_{0.01}O_2$,
Anode active material: Graphite, Upper-limit voltage: 4.6 V

| Example | Cyclic ether compound Kind | Content (wt %) | Other compound Kind | Content (wt %) | Capacity retention rate (%) | Swollenness rate (%) |
|---|---|---|---|---|---|---|
| 5-1  | Formula (10-1) | 0.01 | — | — | 48 | 309 |
| 5-2  |                | 0.1  |   |   | 51 | 301 |
| 5-3  |                | 1    |   |   | 51 | 298 |
| 5-4  |                | 3    |   |   | 44 | 297 |
| 5-5  | Formula (10-2) | 0.01 |   |   | 53 | 296 |
| 5-6  |                | 0.1  |   |   | 58 | 273 |
| 5-7  |                | 1    |   |   | 57 | 260 |
| 5-8  |                | 3    |   |   | 48 | 255 |
| 5-9  | Formula (10-3) | 0.01 |   |   | 55 | 286 |
| 5-10 |                | 0.1  |   |   | 61 | 263 |
| 5-11 |                | 1    |   |   | 60 | 251 |
| 5-12 |                | 3    |   |   | 50 | 246 |
| 5-13 | Formula (10-12)| 0.01 |   |   | 51 | 297 |
| 5-14 |                | 0.1  |   |   | 55 | 274 |
| 5-15 |                | 1    |   |   | 54 | 264 |
| 5-16 |                | 3    |   |   | 47 | 257 |
| 5-17 | Formula (11-1) | 0.01 |   |   | 48 | 316 |
| 5-18 |                | 0.1  |   |   | 52 | 312 |
| 5-19 |                | 1    |   |   | 51 | 309 |
| 5-20 |                | 3    |   |   | 45 | 307 |
| 5-21 | Formula (11-2) | 0.01 |   |   | 50 | 298 |
| 5-22 |                | 0.1  |   |   | 55 | 275 |
| 5-23 |                | 1    |   |   | 55 | 264 |
| 5-24 |                | 3    |   |   | 47 | 257 |

TABLE 10

Battery structure: Laminated film type (Electrolytic solution)
Cathode active material: $Li_{1.13}(Mn_{0.60}Ni_{0.20}Co_{0.20})_{0.86}Al_{0.01}O_2$,
Anode active material: Graphite, Upper-limit voltage: 4.6 V

| Example | Cyclic ether compound Kind | Content (wt %) | Other compound Kind | Content (wt %) | Capacity retention rate (%) | Swollenness rate (%) |
|---|---|---|---|---|---|---|
| 5-25 | Formula (11-3) | 0.01 | — | — | 50 | 297 |
| 5-26 |                | 0.1  |   |   | 55 | 274 |
| 5-27 |                | 1    |   |   | 54 | 265 |
| 5-28 |                | 3    |   |   | 47 | 256 |
| 5-29 | Formula (11-4) | 0.01 |   |   | 50 | 298 |
| 5-30 |                | 0.1  |   |   | 53 | 276 |
| 5-31 |                | 1    |   |   | 53 | 265 |
| 5-32 |                | 3    |   |   | 46 | 258 |
| 5-33 | Formula (11-5) | 0.01 |   |   | 47 | 315 |
| 5-34 |                | 0.1  |   |   | 50 | 312 |
| 5-35 |                | 1    |   |   | 49 | 308 |
| 5-36 |                | 3    |   |   | 44 | 307 |
| 5-37 | Formula (12-1) | 0.01 |   |   | 49 | 307 |
| 5-38 |                | 0.1  |   |   | 54 | 300 |
| 5-39 |                | 1    |   |   | 53 | 298 |
| 5-40 |                | 3    |   |   | 46 | 297 |
| 5-41 | Formula (12-2) | 0.01 |   |   | 52 | 295 |
| 5-42 |                | 0.1  |   |   | 58 | 273 |
| 5-43 |                | 1    |   |   | 58 | 262 |
| 5-44 |                | 3    |   |   | 49 | 254 |
| 5-45 | — | — | — | — | 41 | 342 |
| 5-46 | — | — | Formula (24-1) | 1 | 41 | 328 |
| 5-47 |   |   | Formula (24-2) |   | 40 | 339 |
| 5-48 |   |   | Formula (24-3) |   | 39 | 335 |
| 5-49 |   |   | Formula (24-4) |   | 40 | 337 |
| 5-50 |   |   | Formula (24-5) |   | 26 | 320 |
| 5-51 |   |   | Formula (24-6) |   | 29 | 327 |

TABLE 11

Battery structure: Laminated film type (Electrolytic solution)
Cathode active material: $LiNi_{0.05}Mn_{1.50}O_4$, Anode active material: Graphite, Upper-limit voltage: 4.95 V

| Example | Cyclic ether compound Kind | Content (wt %) | Other compound Kind | Content (wt %) | Capacity retention rate (%) | Swollenness rate (%) |
|---|---|---|---|---|---|---|
| 6-1  | Formula (10-1)  | 0.01 | — | — | 36 | 300 |
| 6-2  |                 | 0.1  |   |   | 39 | 274 |
| 6-3  |                 | 1    |   |   | 39 | 266 |
| 6-4  |                 | 3    |   |   | 34 | 262 |
| 6-5  | Formula (10-2)  | 0.01 |   |   | 39 | 280 |
| 6-6  |                 | 0.1  |   |   | 50 | 250 |
| 6-7  |                 | 1    |   |   | 50 | 238 |
| 6-8  |                 | 3    |   |   | 38 | 230 |
| 6-9  | Formula (10-3)  | 0.01 |   |   | 42 | 267 |
| 6-10 |                 | 0.1  |   |   | 55 | 249 |
| 6-11 |                 | 1    |   |   | 54 | 238 |
| 6-12 |                 | 3    |   |   | 40 | 233 |
| 6-13 | Formula (10-12) | 0.01 |   |   | 38 | 284 |
| 6-14 |                 | 0.1  |   |   | 48 | 253 |
| 6-15 |                 | 1    |   |   | 47 | 242 |
| 6-16 |                 | 3    |   |   | 37 | 236 |
| 6-17 | Formula (11-1)  | 0.01 |   |   | 35 | 307 |
| 6-18 |                 | 0.1  |   |   | 39 | 299 |
| 6-19 |                 | 1    |   |   | 38 | 287 |
| 6-20 |                 | 3    |   |   | 33 | 284 |
| 6-21 | Formula (11-2)  | 0.01 |   |   | 37 | 289 |
| 6-22 |                 | 0.1  |   |   | 45 | 259 |
| 6-23 |                 | 1    |   |   | 44 | 247 |
| 6-24 |                 | 3    |   |   | 35 | 243 |

TABLE 12

Battery structure: Laminated film type (Electrolytic solution)
Cathode active material: $LiNi_{0.50}Mn_{1.50}O_4$, Anode active material: Graphite, Upper-limit voltage: 4.95 V

| Example | Cyclic ether compound Kind | Content (wt %) | Other compound Kind | Content (wt %) | Capacity retention rate (%) | Swollenness rate (%) |
|---|---|---|---|---|---|---|
| 6-25 | Formula (11-3) | 0.01 | — | — | 36 | 286 |
| 6-26 |                | 0.1  |   |   | 43 | 258 |
| 6-27 |                | 1    |   |   | 43 | 247 |
| 6-28 |                | 3    |   |   | 35 | 243 |
| 6-29 | Formula (11-4) | 0.01 |   |   | 37 | 285 |
| 6-30 |                | 0.1  |   |   | 46 | 254 |

TABLE 12-continued

Battery structure: Laminated film type (Electrolytic solution)
Cathode active material: $LiNi_{0.50}Mn_{1.50}O_4$, Anode active material:
Graphite, Upper-limit voltage: 4.95 V

| Example | Cyclic ether compound Kind | Content (wt %) | Other compound Kind | Content (wt %) | Capacity retention rate (%) | Swollenness rate (%) |
|---|---|---|---|---|---|---|
| 6-31 | | 1 | | | 45 | 244 |
| 6-32 | | 3 | | | 36 | 238 |
| 6-33 | Formula (11-5) | 0.01 | | | 35 | 307 |
| 6-34 | | 0.1 | | | 38 | 298 |
| 6-35 | | 1 | | | 36 | 287 |
| 6-36 | | 3 | | | 33 | 282 |
| 6-37 | Formula (12-1) | 0.01 | | | 37 | 299 |
| 6-38 | | 0.1 | | | 43 | 276 |
| 6-39 | | 1 | | | 42 | 267 |
| 6-40 | | 3 | | | 35 | 262 |
| 6-41 | Formula (12-2) | 0.01 | | | 39 | 277 |
| 6-42 | | 0.1 | | | 50 | 250 |
| 6-43 | | 1 | | | 49 | 236 |
| 6-44 | | 3 | | | 38 | 229 |
| 6-45 | — | — | — | — | 31 | 325 |
| 6-46 | — | — | Formula (24-1) | 1 | 31 | 314 |
| 6-47 | | | Formula (24-2) | | 26 | 322 |
| 6-48 | | | Formula (24-3) | | 26 | 323 |
| 6-49 | | | Formula (24-4) | | 22 | 320 |
| 6-50 | | | Formula (24-5) | | 18 | 309 |
| 6-51 | | | Formula (24-6) | | 21 | 314 |

Also when the kind of the cathode active material was changed (Tables 9 to 12), results similar to those before the change (Tables 1 and 2) were obtained. Specifically, in the case where the cyclic ether compound was used (Examples 5-1 to 5-44 and 6-1 to 6-44), the capacity retention rate was largely increased, and the swollenness rate was largely decreased, compared to the case where the cyclic ether compound was not used (Examples 5-45 to 5-51 and 6-45 to 6-51). Description of other tendencies is omitted here.

As can be seen from the results in Tables 1 to 12, when the electrolytic solution of the secondary battery included the cyclic ether compound, both of the low-temperature cycle characteristics and the high-temperature swollenness characteristics were improved. Accordingly, superior battery characteristics were achieved.

The present application has been described above referring to the embodiment and Examples. However, the present application is not limited to the examples described in the embodiment and Examples, and may be variously modified. For example, the description has been given with the specific examples of the case in which the battery structure is of a cylindrical type or a laminated film type and the battery device has a spirally wound structure. However, applicable structures are not limited thereto. The secondary battery of the present application is similarly applicable to a case where the secondary battery has other battery structure such as a square type, a coin type, and a button type, and to a case where the battery device has other structure such as a laminated structure.

Moreover, the non-aqueous electrolytic solution of the embodiment of the present application is not limitedly applied to the secondary battery, but may be applied to other electrochemical device. Examples of such other electrochemical device may include a capacitor.

Moreover, for example, the electrode reactant may be any of other Group 1 elements such as sodium (Na) and potassium (K), Group 2 elements such as magnesium and calcium, and other light metal such as aluminum. The effects of the present application should be obtained independently of the kind of the electrode reactant. Accordingly, similar effects are achieved also when the kind of the electrode reactant is changed.

Moreover, concerning the content of the cyclic ether compound, the appropriate range derived from the results of Examples has been described. However, the description does not totally deny a possibility that the content is out of the above-described range. In other words, the above-described appropriate range is merely a range that is especially preferable for achieving the effects of the present application. Accordingly, the content may be out of the above-described range to some extent as long as the effects of the present application are achieved.

It is possible to achieve at least the following configurations from the above-described example embodiments and the modifications of the technology.

(1) A secondary battery including:
  a cathode;
  an anode; and
  non-aqueous electrolytic solution including a cyclic ether compound,
  the cyclic ether compound including a skeleton and one or more substituent groups introduced into the skeleton,
  the skeleton including one or more four-or-more-membered oxygen-containing rings, and the one or more substituent groups each being a monovalent group represented by Formula (1),

—X—O—R    (1)

where X is one of a divalent chain saturated hydrocarbon group, a halide group thereof, and nothing,
R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, at least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C═C— and —C≡C—) bonded to an ether bond (—O—).

(2) The secondary battery according to (1), wherein at least one of the one or more substituent groups is introduced into at least one of the one or more four-or-more-membered oxygen-containing rings in the skeleton.

(3) The secondary battery according to (1) or (2), wherein
  number of the substituent groups is two or larger,
  all of two or more Rs each include one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and each include a carbon-carbon multiple bond bonded to an ether bond.

(4) The secondary battery according to any one of (1) to (3), wherein the one or more four-or-more-membered oxygen-containing rings are each one of compounds represented by respective Formulas (2-1) to (2-12) and (3-1) to (3-12),

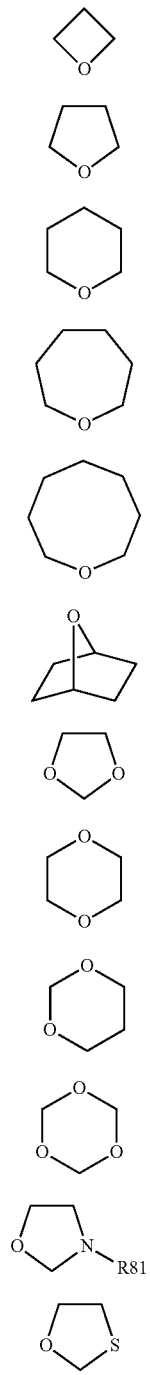

(2-1)
(2-2)
(2-3)
(2-4)
(2-5)
(2-6)
(2-7)
(2-8)
(2-9)
(2-10)
(2-11)

(2-12)

where R81 is one of a hydrogen group and a monovalent chain saturated hydrocarbon group, (3-1)

 (3-2)

 (3-3)

 (3-4)

 (3-5)

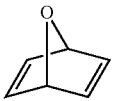 (3-6)

 (3-7)

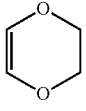 (3-8)

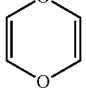 (3-9)

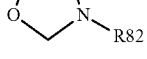 (3-10)

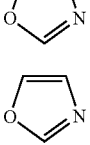 (3-11)

(3-12)

where R82 is one of a hydrogen group and a monovalent chain saturated hydrocarbon group.

(5) The secondary battery according to any one of (1) to (4), wherein the divalent chain saturated hydrocarbon group is an alkylene group having carbon number from 1 to 4 both inclusive, the monovalent chain saturated hydrocarbon group is an alkyl group having carbon number from 1 to 8 both inclusive, the monovalent chain unsaturated hydrocarbon group is one of an alkenyl group having carbon number from 2 to 8 both inclusive and an alkynyl group having carbon number from 2 to 8 both inclusive, the monovalent cyclic saturated hydrocarbon group is a cycloalkyl group having carbon number from 3 to 18 both inclusive, the monovalent cyclic unsaturated hydrocarbon group is one of an aryl group having carbon number from 6 to 18 both inclusive and a group represented by Formula (30-1), the monovalent oxygen-containing cyclic saturated hydrocarbon group is one of groups represented by respective Formulas (30-2) to (30-4), the monovalent oxygen-containing cyclic unsaturated hydrocarbon group is one of groups represented by respective Formulas (30-5) to (30-7), the halide group is a group obtained by substituting one or more halogen groups for one or more hydrogen groups in one of the divalent chain saturated hydrocarbon group, the monovalent chain saturated hydrocarbon group, the monovalent chain unsaturated hydrocarbon group, the monovalent cyclic saturated hydrocarbon group, the monovalent cyclic unsaturated hydrocarbon group, the monovalent oxygen-containing cyclic saturated hydrocarbon group, and the monovalent oxygen-containing cyclic unsaturated hydrocarbon group, and the halogen group includes one or more of a fluorine group, a chlorine group, a bromine group, and an iodine group.

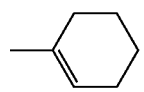

(30-1)

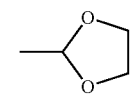

(30-2)

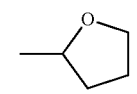

(30-3)

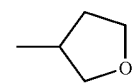

(30-4)

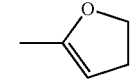

(30-5)

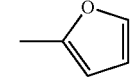

(30-6)

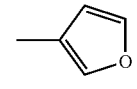

(30-7)

(6) The secondary battery according to any one of (1) to (5), wherein the cyclic ether compound includes one or more of compounds represented by respective Formulas (4) to (6),

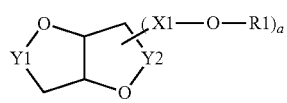

(4)

where X1 is one of a divalent chain saturated hydrocarbon group, a halide group thereof, and nothing, R1 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, a is an integer of 1 or larger, Y1 and Y2 are each one of a divalent chain saturated hydrocarbon group and a halide group thereof, at least one of one or more R1 s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

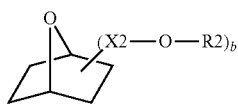

(5)

where X2 is one of a divalent chain saturated hydrocarbon group, a halide group thereof, and nothing, R2 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, b is an integer of 1 or larger, at least one of one or more R2s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

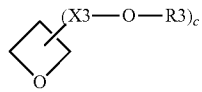

(6)

where X3 is one of a divalent chain saturated hydrocarbon group, a halide group thereof, and nothing, R3 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, c is an integer of 1 or larger, at least one of one or more R3s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.

(7) The secondary battery according to any one of (1) to (6), wherein the cyclic ether compound includes one or more of compounds represented by respective Formulas (7) to (9),

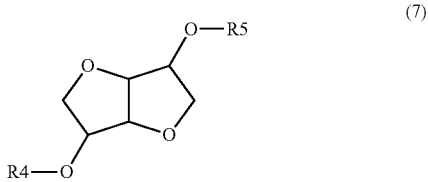

(7)

where R4 and R5 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, and at least one of R4 and R5 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond,

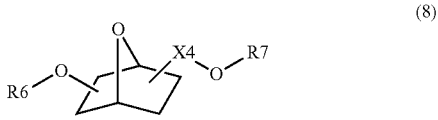

(8)

where X4 is one of a divalent chain saturated hydrocarbon group, a halide group thereof, and nothing, R6 and R7 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, and at least one of R6 and R7 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond,

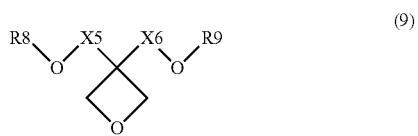

(9)

where X5 and X6 are each one of a divalent chain saturated hydrocarbon group, a halide group thereof, and nothing, R8 and R9 are each one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, and at least one of R8 and R9 includes one or more of the monovalent chain unsaturated hydrocarbon group, the monovalent cyclic unsaturated hydrocarbon group, the monovalent oxygen-containing cyclic unsaturated hydrocarbon group, and the halide group thereof, and the monovalent group obtained by bonding two or more thereof, and includes a carbon-carbon multiple bond bonded to an ether bond.

(8) The secondary battery according to any one of (1) to (7), wherein a content of the cyclic ether compound in the electrolytic solution is from about 0.01 weight percent to about 3 weight percent both inclusive.

(9) The secondary battery according to any one of (1) to (8), wherein the secondary battery is a lithium ion secondary battery.

(10) Non-aqueous electrolytic solution including:
a cyclic ether compound including a skeleton and one or more substituent groups introduced into the skeleton;
the skeleton including one or more four-or-more-membered oxygen-containing rings; and
the one or more substituent groups each being a monovalent group represented by Formula (1),

(1)

where X is one of a divalent chain saturated hydrocarbon group, a halide group thereof, and nothing,
R is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group, at least one of one or more Rs includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond (one of —C=C— and —C≡C—) bonded to an ether bond (—O—).

(11) A battery pack including:
the secondary battery according to any one of (1) to (9);
a control section configured to control operation of the secondary battery; and a switch section configured to switch the operation of the secondary battery according to an instruction of the control section.

(12) An electric vehicle including:
the secondary battery according to any one of (1) to (9);
a conversion section configured to convert electric power supplied from the secondary battery into drive power;
a drive section configured to operate according to the drive power; and
a control section configured to control operation of the secondary battery.

(13) An electric power storage system including:
the secondary battery according to any one of (1) to (9);
one or more electric devices configured to be supplied with electric power from the secondary battery; and
a control section configured to control the supplying of the electric power from the secondary battery to the one or more electric devices.

(14) An electric power tool including:
the secondary battery according to any one of (1) to (9); and
a movable section configured to be supplied with electric power from the secondary battery.

(15) An electronic apparatus including
the secondary battery according to any one of (1) to (9) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
a non-aqueous electrolytic solution including a cyclic ether compound,
wherein the cyclic ether compound includes one or more of compounds represented by respective Formulas (4) to (6),

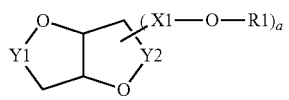

(4)

where X1 is one of a divalent chain saturated hydrocarbon group, a halide group thereof, and nothing,
R1 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
a is an integer of 1 or larger,
Y1 and Y2 are each one of a divalent chain saturated hydrocarbon group and a halide group thereof,
at least one of one or more R1s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

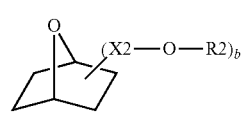

(5)

where X2 is one of a divalent chain saturated hydrocarbon group, a halide group thereof, and nothing,
R2 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
b is an integer of 1 or larger,
at least one of one or more R2s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

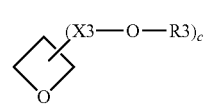

(6)

where X3 is one of a divalent chain saturated hydrocarbon group, a halide group thereof, and nothing,
R3 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
c is an integer of 1 or larger,
at least one of one or more R3s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.

2. The secondary battery according to claim 1, wherein a content of the cyclic ether compound in the electrolytic solution is from about 0.01 weight percent to about 3 weight percent both inclusive.

3. The secondary battery according to claim 1, wherein the secondary battery is a lithium ion secondary battery.

4. A non-aqueous electrolytic solution comprising:
a cyclic ether compound including one or more of compounds represented by respective Formulas (4) to (6),

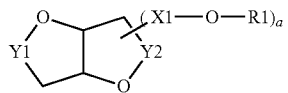 (4)

where X1 is one of a divalent chain saturated hydrocarbon group, a halide group thereof, and nothing,
R1 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
a is an integer of 1 or larger,
Y1 and Y2 are each one of a divalent chain saturated hydrocarbon group and a halide group thereof,
at least one of one or more R1 s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

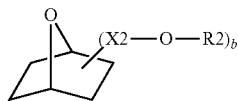 (5)

where X2 is one of a divalent chain saturated hydrocarbon group, a halide group thereof, and nothing,
R2 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
b is an integer of 1 or larger,
at least one of one or more R2s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond,

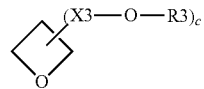 (6)

where X3 is one of a divalent chain saturated hydrocarbon group, a halide group thereof, and nothing,
R3 is one of a monovalent chain saturated hydrocarbon group, a monovalent chain unsaturated hydrocarbon group, a monovalent cyclic saturated hydrocarbon group, a monovalent cyclic unsaturated hydrocarbon group, a monovalent oxygen-containing cyclic saturated hydrocarbon group, a monovalent oxygen-containing cyclic unsaturated hydrocarbon group, a halide group thereof, a monovalent group obtained by bonding two or more thereof, and a hydrogen group,
c is an integer of 1 or larger,
at least one of one or more R3s includes one or more of the monovalent chain unsaturated hydrocarbon group, the monovalent cyclic unsaturated hydrocarbon group, the monovalent oxygen-containing cyclic unsaturated hydrocarbon group, the halide group thereof, and the monovalent group obtained by bonding two or more thereof, and includes a carbon-carbon multiple bond bonded to an ether bond.

5. A battery pack comprising:
the secondary battery of claim 1;
a control section configured to control operation of the secondary battery; and
a switch section configured to switch the operation of the secondary battery according to an instruction of the control section.

6. An electric vehicle comprising:
the secondary battery of claim 1;
a conversion section configured to convert electric power supplied from the secondary battery into drive power;
a drive section configured to operate according to the drive power; and
a control section configured to control operation of the secondary battery.

7. An electric power storage system comprising:
the secondary battery of claim 1;
one or more electric devices configured to be supplied with electric power from the secondary battery; and
a control section configured to control the supplying of the electric power from the secondary battery to the one or more electric devices.

8. An electric power tool comprising:
the secondary battery of claim 1; and
a movable section configured to be supplied with electric power from the secondary battery.

9. An electronic apparatus comprising the secondary battery of claim 1 as an electric power supply source.

* * * * *